US011854027B1

(12) United States Patent
Gee et al.

(10) Patent No.: US 11,854,027 B1
(45) Date of Patent: Dec. 26, 2023

(54) VIDEO SURVEY

(71) Applicant: Vivint, Inc., Provo, UT (US)

(72) Inventors: Ryan Gee, Cedar Hills, UT (US); David Jones, Lehi, UT (US); Rastislav Nukovic, Provo, UT (US)

(73) Assignee: VIVINT, INC., Provo, UT (US)

( * ) Notice: Subject to any disclaimer, the term of this patent is extended or adjusted under 35 U.S.C. 154(b) by 209 days.

(21) Appl. No.: 17/010,740

(22) Filed: Sep. 2, 2020

(51) Int. Cl.
*G06Q 30/0203* (2023.01)
*H04N 7/14* (2006.01)
*G06V 20/40* (2022.01)
*G06V 40/20* (2022.01)
*G06V 40/16* (2022.01)

(52) U.S. Cl.
CPC ......... *G06Q 30/0203* (2013.01); *G06V 20/46* (2022.01); *G06V 40/172* (2022.01); *G06V 40/20* (2022.01); *H04N 7/147* (2013.01)

(58) Field of Classification Search
CPC .. G06Q 30/02; G06Q 30/0203; G06Q 30/016; G06K 9/00; H04N 7/14
See application file for complete search history.

(56) References Cited

U.S. PATENT DOCUMENTS

| | | | |
|---|---|---|---|
| 2016/0029145 A1* | 1/2016 | Angiolillo | H04W 24/08 |
| | | | 455/418 |
| 2018/0315063 A1* | 11/2018 | Cheesman | A61B 5/165 |
| 2019/0296995 A1* | 9/2019 | Currie | H04L 41/0806 |
| 2020/0013076 A1* | 1/2020 | Rinzler | G06Q 30/0203 |
| 2021/0326796 A1* | 10/2021 | Bhatnagar | G06Q 10/063112 |

FOREIGN PATENT DOCUMENTS

| | | | | |
|---|---|---|---|---|
| EP | 3174269 A1 * | 5/2017 | | G06F 21/10 |
| RU | 138658 U1 * | 3/2014 | | |

* cited by examiner

*Primary Examiner* — Melur Ramakrishnaiah
(74) *Attorney, Agent, or Firm* — Kunzler Bean & Adamson

(57) ABSTRACT

Techniques are described for a video survey. One method includes providing a video survey to a customer or a potential customer of a service, sale, product, or system. The video survey may be provided before, during, or after a provided service. In some cases, the customer or the potential customer may provide one or more responses to one or more requests included in the video survey. The video survey may record the one or more responses to the one or more requests. In some examples, the provided responses may be a video response, an audio response, a tactile response, or any combination thereof. The video survey may proceed or conclude based on the response being a positive response or a negative response.

20 Claims, 11 Drawing Sheets

VIDEO SURVEY

BACKGROUND

The following relates generally to video surveys, and more specifically to smart surveying techniques.

Automation systems and services, e.g., for homes and commercial businesses, are widely deployed to provide various types of communication and functional features. In some settings, it may be desirable to receive information, from a customer, relating to a service (e.g., an installation of a device or system, the sale of a product, etc.). As an example, a smart home environment may be installed by a personnel. Such an installation may provide automated control related to a subsystem of the smart home (e.g., a heating, ventilation and air condition (HVAC) system, a lighting system, a solar energy system, a home theater and entertainment system, a security system, etc.). Although some techniques related to surveying may provide for receiving customer information or feedback, these techniques may be inefficient, and more robust techniques are desired.

SUMMARY

The described techniques relate to improved methods, systems, devices, and techniques that support video surveys. Generally, the described techniques enable a customer to provide information related to a service (e.g., the installation of a system, such as a system or subsystem of a smart home environment, the sale of a product, etc.). The described techniques also provide for customer authentication, efficient survey implementation and storage, and robust survey response options.

In some cases, a customer may be provided a service (e.g., an installation of a device or system, the sale of a product, etc.). A video survey associated with the service may be performed prior to the service. In some cases, the video survey may be performed after completion of the service. The video survey may be accessed and displayed to a customer or potential customer. The customer or potential customer may provide a response to a displayed request (or question). The video survey may record a number of responses (e.g., a video response, an audio response, a tactile response, or a combination thereof) provided by the customer or potential customer, in response to the displayed request. The video survey may proceed (e.g., provide a further request associated with the video survey) or terminate based on the recorded response. Such a video survey may enable a customer to provide information or feedback in an authentic and efficient manner.

A method for a video survey is described. The method may include receiving a request to access the video survey for a customer, displaying, at the computing device, at least one request associated with the video survey, recording, by a camera included in the computing device, an action of receiving a response to the at least one request associated with the video survey, where the response is received from the customer, and concluding the video survey based on the response to the at least one request.

An apparatus for video survey is described. The apparatus may include a processor, memory in electronic communication with the processor, and instructions stored in the memory. The instructions may cause the processor to receive a request to access the video survey for a customer, display, at the computing device, at least one request associated with the video survey, record, by a camera included in the computing device, an action of receiving a response to the at least one request associated with the video survey, where the response is received from the customer, and conclude the video survey based on the response to the at least one request.

A non-transitory computer readable medium for video survey is described. The non-transitory computer readable medium may store a program that, when executed by a processor, causes the processor to receive a request to access the video survey for a customer, display, at the computing device, at least one request associated with the video survey, record, by a camera included in the computing device, an action of receiving a response to the at least one request associated with the video survey, where the response is received from the customer, and conclude the video survey based on the response to the at least one request.

In some examples of the method, apparatus, and/or non-transitory computer-readable medium described above, the response to the at least one request may include at least one of a video response, an audio response, a tactile response, or a combination thereof.

Some examples of the method, apparatus, and/or non-transitory computer-readable medium may further include processes, features, means, and/or instructions for: receiving, at the camera included in the computing device, a video of the customer, detecting a face of the customer in a field-of-view (FOV) of the camera, and performing an image recognition analysis on the detected face, where receiving the video response to the at least one request is based on the image recognition analysis.

Some examples of the method, apparatus, and/or non-transitory computer-readable medium may further include processes, features, means, and/or instructions for: identifying one or more facial features of the customer based on the image recognition analysis, and identifying a gesture associated with the video response to the at least one question included in the video survey, where the gesture is identified based on the one or more facial features.

Some examples of the method, apparatus, and/or non-transitory computer-readable medium may further include processes, features, means, and/or instructions for: analyzing the gesture to determine whether the gesture is a positive gesture or a negative gesture, where concluding the video survey is based on the analyzing.

Some examples of the method, apparatus, and/or non-transitory computer-readable medium may further include processes, features, means, and/or instructions for: receiving, from the customer, the audio response to the at least one request associated with the video survey, and analyzing the audio response to determine whether the audio response is a positive response to the at least one request or a negative response to the at least one request, where concluding the video survey is based on the analyzing.

Some examples of the method, apparatus, and/or non-transitory computer-readable medium may further include processes, features, means, and/or instructions for: displaying, on a first portion of a display of the computing device, a video of a representative associated with a service, and displaying, on a second portion of the display of the computing device, the at least one request and one or more instructions to respond to the at least one request.

Some examples of the method, apparatus, and/or non-transitory computer-readable medium may further include processes, features, means, and/or instructions for: displaying a first answer to the at least one request and a second answer to the at least one request, where the first answer is a positive response to the at least one request and the second answer is a negative response to the at least one request.

Some examples of the method, apparatus, and/or non-transitory computer-readable medium may further include processes, features, means, and/or instructions for: receiving, from the customer, a tactile response to the at least one request included in the video survey, and analyzing the tactile response to determine whether the tactile response includes a selection of the first answer or the second answer, where concluding the video survey is based on the analyzing.

In some examples of the method, apparatus, and/or non-transitory computer-readable medium described above, concluding the video survey may further include: determining that a predetermined number of requests associated with the video survey has been displayed at the computing device, and generating an account associated with the customer based on the determining.

In some examples of the method, apparatus, and/or non-transitory computer-readable medium described above, the video survey may include at least one of a survey performed prior to a service, a survey performed after the service, or a combination thereof.

In some examples of the method, apparatus, and/or non-transitory computer-readable medium described above, the at least one request associated with the survey performed prior to a service may include a question to seek consent to record the video survey, a question related to a monthly payment associated with the service, a question related to a duration of a contract associated with the service, a question related to an appearance of a personnel associated with the service, or a combination thereof.

In some examples of the method, apparatus, and/or non-transitory computer-readable medium described above, the at least one request associated with the survey performed after the service may include a question to seek consent to record the video survey, a question related to receiving one or more copies of an agreement associated with the service, a question related to a behavior of a personnel associated with the service, or a combination thereof.

Some examples of the method, apparatus, and/or non-transitory computer-readable medium may further include processes, features, means, and/or instructions for: determining a duration of a contract associated with the customer based on concluding the video survey, and storing the video survey for the duration of the contract associated with the customer.

In some examples of the method, apparatus, and/or non-transitory computer-readable medium described above, the video survey may be associated with a security and automation system.

DETAILED DESCRIPTION

Figure 1:
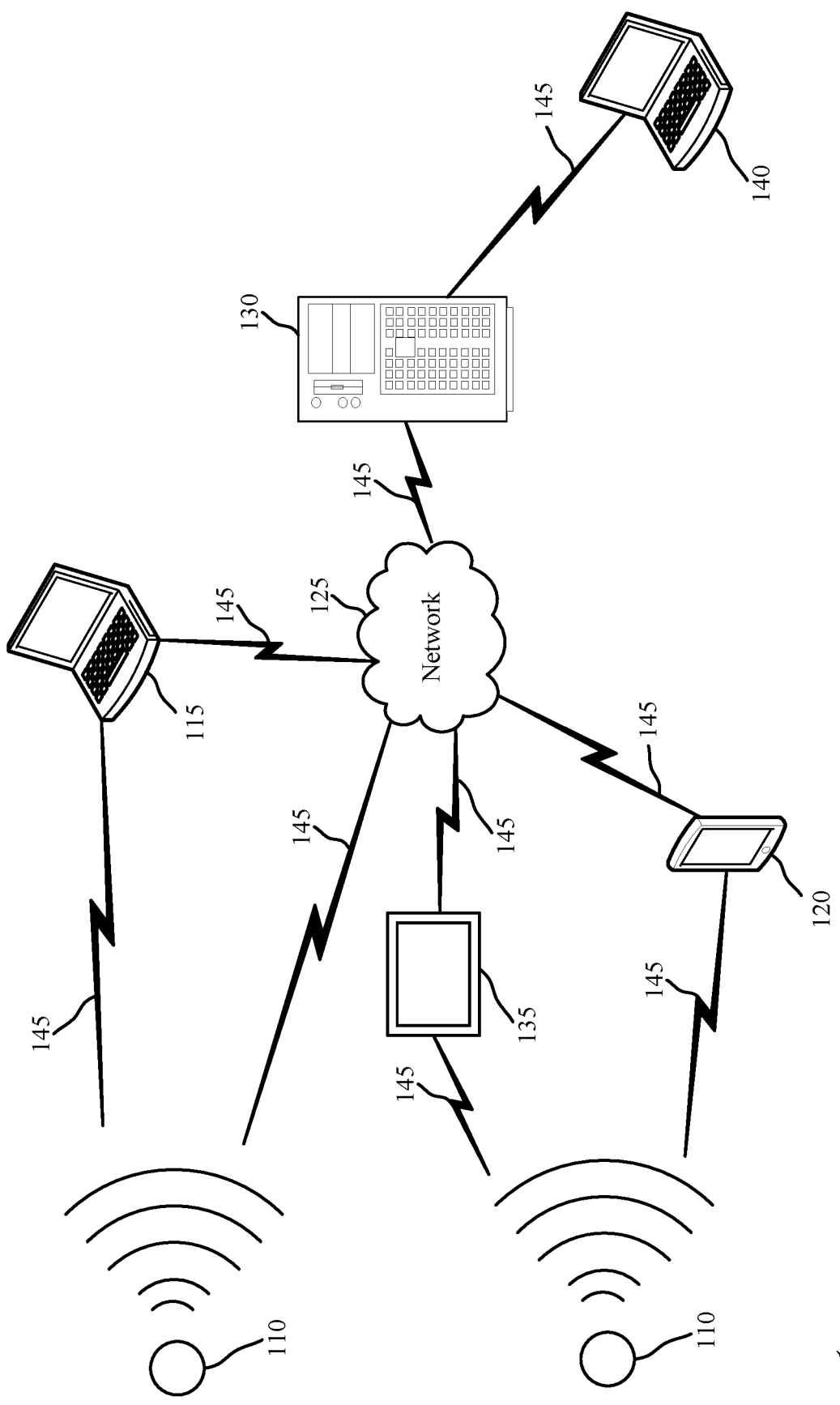
FIG. 1 illustrates an example of a system that supports a video survey in accordance with aspects of the present disclosure.

The described techniques relate to improved methods, systems, or apparatuses that support a video survey. A customer may be provided a service (e.g., an installation of a device or system, the sale of a product, etc.). In some cases, it may be desirable to obtain customer information or feedback associated with the service (e.g., the installation of a security and automation system, the sale of a car, the purchase/installation of a solar energy system, etc.) and/or a personnel providing the service. According to one or more existing techniques, the customer may fill out a survey after the installation. Traditionally, a personnel may provide the customer with a paper survey to manually complete. In some cases, the customer may receive a survey by some other means (such as a phone call after departure of the personnel). However, such a process of surveying customers may be inefficient and unverifiable. For example, a paper survey may be difficult to authenticate as being filled out by the intended party (e.g., the customer). Additionally, the paper survey may require time and resources of a personnel. For example, reviewing the responses of a paper survey may be time-consuming for a personnel associated with the service. Further, the paper survey may require physical storage space and transportation. Thus, such surveys may not be reliable, and more robust surveying techniques may be desired.

As described herein, techniques may be used to provide for efficient, verifiable, and robust customer information and feedback. For instance, the customer may receive a video survey associated with the service (e.g., an installation of a system). In some cases, the video survey may be accessed and displayed by a computing device. In some cases, the computing device may be a device belonging to (or provided to) a personnel associated with the service, or the computing device may be owned by the customer. The computing device may include an application associated with the service (e.g., a security and automation system, a provider of a system, product, sale, etc.). For example, the application may include the video survey. The application may also include information related to the service, such as a customer or potential customer user profile, a personnel user profile, payment information, a contract associated with the service (e.g., a security and automation system or subsystem), etc.

In some examples, a personnel may provide a service to a customer (e.g., installing a system of a smart home environment at the customer's home, selling a product, etc.). Prior to the service, the personnel may provide a video survey to the customer, such as a pre-installation survey. In some cases, the video survey may be intended to provide the customer with information related to the service. For example, the video survey may provide a contract associated with the service, information about installed systems, etc. In some cases, the video survey may be intended to receive, from the customer or potential customer, information related to the service. For example, the video survey may receive responses indicating that the customer understands the terms of the contract, provides consent to record and store the video survey, verifies an appearance of the personnel, etc. In some examples, the video survey may proceed or conclude based on the received responses.

In other alternative embodiments, the personnel may provide a video survey to the customer after completion of the service (e.g., an installation process). In some cases, the video survey provided after the service, such as a post-installation survey, may be intended to receive feedback related to the service (such as the installation process). For example, the video survey may present one or more questions (e.g., requests) to the customer about a behavior of a personnel, about providing consent to record and/or store the video survey, about confirmation that the customer has received copies of an agreement (e.g., the contract), or any combination thereof. In some examples, the video survey may receive responses to the questions and proceed or conclude based on the received responses.

In some examples, the computing device (such as the computing device belonging to a personnel) may receive a request to access a video survey for a customer of the service. For instance, a personnel (or technician) installing the system or subsystem may request to access a video survey (e.g., pre-installation survey, post-installation survey, or both) for the customer. The computing device may receive the request and retrieve the video survey (e.g., from the device, a remote server, or the like).

In response to retrieving the video survey from the remote server, the computing device may display the video survey. For example, the computing device may display the video survey on a display screen. The displayed video survey may include at least one request. In some cases, the displayed video survey may include at least one question. Additionally or alternatively, the video survey may display a video of a representative (such as a representative of the service). The video of the representative may include audio and/or visual cues to present the request to the customer. For example, the video of the representative may display a recording of the representative providing information relating to a request (such as a question) and/or instructions on how to respond to the request (such as a question). Additionally, the video survey may display one or more instructions to the customer indicating how to respond to the request. For example, the video survey may have a portion of the screen with instructions to touch a button related to the request, audibly answer a request, make a gesture to answer the request, or any combination thereof. In some examples, the display screen of the computing device may display one or more responses to a question included in the video survey. For example, the responses may include a first answer to a request (e.g., a positive response to a question) and a second answer to a request (e.g., a negative response to the question). For example, a first question in the video survey may include seeking consent, from the customer, to record the survey (e.g., "This survey may be recorded. Do you agree to be video recorded?").

The video survey may include one or more requests (e.g., questions). Such requests may include, but are not limited to, information related to the customer, the service (e.g., the security and automation system or subsystem), the personnel installing a system or subsystem, or any combination thereof. For example, a video survey may include a question seeking consent to record responses, a question related to an appearance of a personnel installing the system, etc. In some cases, the video survey only includes one question. In other cases, the video survey includes multiple questions. In some cases, a video survey may be concluded based on a response received from a customer or a potential customer.

The video survey may receive one or more responses to each of the one or more requests. In some cases, the video survey may record an action associated with a response. For example, a customer may perform an action to indicate a response (e.g., a video response, an audio response, and/or a tactile response), and the video survey may record the action. As previously described, the video survey may seek consent from the potential customer prior to recording the response. In some cases, the computing device performing the video survey may store the recording (e.g., in the device, on a remote server, or the like).

In some cases, a personnel may retrieve the video survey on a computing device, and may provide the video survey to a potential customer. The potential customer may view a request (or a question) and may provide a response to the request with a video response. For example, the customer may answer a question by providing video feedback. In such examples, a computing device may detect a face of the customer in a field-of-view (FOV) of a camera of the computing device. The computing device may then perform an image recognition analysis on the detected face. For example, the computing device may verify an identity of the customer based on the image recognition analysis (e.g., verifying an identity of an existing customer). In some cases, the computing device may verify the identity of the customer based on identifying one or more facial features of the customer. Additionally or alternatively, the computing device may monitor and analyze the received video of the customer (e.g., to detect a positive or negative response). For example, the customer may answer a question by providing a gesture (e.g., a nod or a shake of the head to indicate a positive or a negative response, respectively). In some examples, the computing device may identify one or more facial features of the customer and identify a gesture based on the identified facial features. For example, the computing device may verify a customer and identify a nodding or shaking of the head based on the horizontal or vertical motion of a facial profile. The identified gesture (e.g., nodding or shaking of the head) may then be analyzed to determine if the gesture is a positive or a negative gesture. The video survey may interpret a positive gesture as a positive response to a survey request, and a negative gesture as a negative response to a survey request (such as a question). In some cases, the video survey may conclude based on a type of response (i.e., whether the response is positive or negative).

Additionally or alternatively, a customer may provide a response to a request with an audio response. For example, the customer may answer a question by providing audio feedback (e.g., saying yes or no into an audio receiver of a computing device). A computing device (e.g., the computing device displaying the survey) may receive the audio response and may analyze the response (e.g., using voice recognition). The computing device may interpret the audio response as a positive or a negative response to the request. In some cases, the computing device may identify a tone of the audio response based on voice recognition techniques. For example, the computing device may receive an audio response and perform an analysis on the response. The analysis may recognize a positive word (e.g., "yes," "sure,"

"I agree," etc.) and identify a positive response based on the recognition. Additionally or alternatively, the analysis may recognize a negative word (e.g., "no," "nope," "I do not agree," etc.) and identify a negative response based on the recognition. In some cases, the computing device may transmit a copy of the audio response to a cloud-based server. For example, instead of analyzing the response at the computing device, the computing device may receive the analysis from the cloud-based server. In some cases, the video survey may conclude based on the tone of the audio response (i.e., whether the response is positive or negative).

Additionally or alternatively, a customer may provide a response to a request with a tactile response. For example, the customer may answer a question by providing tactile feedback. In some examples, the customer may touch a displayed button on a computing device indicating a positive response or a negative response. The computing device may detect that the customer touched a positive response or a negative response and determine that a survey request has been answered accordingly. In some cases, the video survey may conclude based on a determining whether the response is a positive response or a negative response.

As previously discussed, the video survey may conclude or proceed on the computing device based on a received response. For example, a customer or potential customer may provide a response to a request of the video survey. The video survey may determine whether the response was a positive response or a negative response. The video survey may determine to conclude or proceed based on the response. For example, a customer or potential customer may be asked whether they understand the terms of the installation in a video survey. If the customer or potential customer provides a positive response, the video survey may proceed and display another question. In other cases, if the customer or potential customer provides a negative response, the video survey may conclude. In some examples, the video survey may conclude if the customer or potential customer provides a positive response and there are no more questions to display. In other examples, the video survey may proceed and display another question if the customer provides a negative response to a prior question.

In some cases, the video survey may determine a number of requests associated with the video survey. In such cases, the video survey may also determine whether the number of requests have been displayed at a computing device. For instance, if the video survey determines that there are six requests (or questions), and a customer or potential customer has responded to six requests (or questions), then the video survey may conclude. In some cases, number of requests associated with the video survey may vary of a type of video survey. For example, a pre-installation survey may include different number of questions from a post-installation survey. Additionally, an application associated with the video survey may generate an account associated with the potential customer upon conclusion of the video survey. For example, if a customer successfully completes the video survey, the computing device and/or a cloud-based service associated with the service may generate the account for the potential customer.

In some cases, a service, such as an installed system or subsystem of the security and automation system, may be associated with a contract. The contract may detail a customer agreement related to the service or installation. The contract may detail a monthly payment and a duration of the contract. As an example, a system or subsystem of the security and automation system may be installed based on a potential customer agreeing to the terms of the contract. In some cases, one or more questions associated with the video survey may include details associated with the contract.

An application associated with the video survey may determine a duration of the contract. In some cases, the application associated with the video survey may determine a duration of the contract when concluding the survey. In some cases, a potential customer may answer a request and indicate an understanding of a duration of the contract. In some cases, a computing device performing the video survey may store the video survey based on the duration of the contract. In some cases, the computing device performing the video survey may transmit the video survey for storage at an external device (e.g., on a remote server, or the like). According to some instances, the video survey may be stored for the duration of the contract and may be deleted once the contract duration has ended. Additionally or alternatively, the video survey may be stored for the duration of the contract and may be deleted if the contract is not renewed within a threshold period after expiration of the contract.

A customer or potential customer may receive a video survey prior to an installation service (e.g., a pre-installation survey), after a service (e.g., post-installation survey), or both. The customer or potential customer may receive one or more requests associated with the video survey. The requests may vary depending on whether the video survey is received before an service, after a service, or both. In some cases, a potential customer may receive a pre-installation survey. The customer may receive one or more requests associated with the pre-installation survey. For example, the pre-installation survey may include a question seeking consent to record the video survey. Additionally or alternatively, the pre-installation survey may include a question related to a contract of the system or subsystem of the security and automation system. For example, the potential customer may receive a question (or request) related to a monthly payment of the contract and/or a question (or request) related to the duration of the contract. Additionally or alternatively, the pre-installation survey may include a question related to a personnel installing the system (e.g., an appearance of personnel). Further, the pre-installation survey may include any combination of the above questions.

In some examples, a customer may receive a post-installation survey. The customer may receive one or more requests associated with the post-installation survey. For example, the post-installation survey may include a question seeking consent to record the video survey. Additionally or alternatively, the post-installation survey may include a question asking a customer to confirm receipt of one or more copies of an agreement (e.g., a contract associated with the installed system or subsystem of the security and automation system). Additionally or alternatively, the post-installation survey may include a question related to a personnel installing the system (e.g., the behavior of the personnel, whether the personnel cleaned the site of installation, etc.). Further, the post-installation survey may include any combination of the above questions.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 shows a block diagram relating to an example security and automation system 100, in accordance with one or more examples of the present disclosure. The security and automation system 100 may include one or more sensor units 110, local computing device 120, peripheral device 135, remote computing device 140, and server 155. The network 125 may provide person authentication credentials, encryption, access authorization, tracking, Internet Protocol (IP) connectivity, and other access, computation, modification, and/or functions. The peripheral device 135 may interface with the network 125 through a first set of wired and/or wireless communication links 145 to communicate with the server 155. The peripheral device 135 may perform communication configuration, adjustment, and/or scheduling for communication with the local computing device 120 and remote computing device 140, or may operate under the control of a controller. Peripheral device 135 may communicate with a back-end server (such as the server 155)—directly and/or indirectly—using the first set of one or more wireless communication links 145. In some examples, the server 155 may be a remote server located at a location different or same from the peripheral device 135, the local computing device 120, and/or the remote computing device 140.

The peripheral device 135 may wirelessly communicate with the remote computing device 140 and the local computing device 120 by way of one or more antennas. The peripheral device 135 may provide communication coverage for a respective coverage area (e.g., residential, commercial). In some examples, the peripheral device 135 may be referred to as a control device, a controller, a base transceiver station, a radio base station, an access point, a radio transceiver, or some other suitable terminology. The coverage area for a peripheral device 135 may be divided into sectors making up only a portion of the coverage area. The security and automation system 100 may include control panels of different types. In some examples, the security and automation system 100 may include overlapping coverage areas for one or more different parameters, including different technologies, features, subscriber preferences, hardware, software, technology, and/or methods.

For example, one or more control panels 135 may be related to one or more discrete structures (e.g., a residential building, a commercial building, or an industrial building) and each of the one more discrete structures may be related to one or more discrete areas. In other examples, multiple control panels 135 may be related to the same one or more discrete structures (e.g., multiple control panels relating to a home and/or a business complex). For example, one or more control panels 135 may be located within a home. Additionally or alternatively, each room within the home may have a designated peripheral device 135 located within each room. In some cases, the one or more control panels 135 may communicate with one another via one or more communication protocols. In some examples, the one or more control panels 135 may form a mesh network within the home and communicate with one another via the mesh network. In some examples, a peripheral device 135 may modify or update a security parameter based on information received from one or more other control panels 135 in the mesh network.

The local computing device 120 or remote computing device 140 may be dispersed throughout the security and automation system 100. In some examples, the local computing device 120 and/or remote computing device 140 may be stationary and/or mobile. In some examples, the local computing device 120 and/or remote computing device 140 may include a cellular phone, a personal digital assistant (PDA), a wireless modem, a wireless communication device, a handheld device, a tablet computer, a laptop computer, a cordless phone, a wireless local loop (WLL) station, a display device (e.g., TVs, computer monitors, etc.), a printer, a camera, and/or the like. The local computing device 120 and/or remote computing device 140 may, additionally or alternatively, include or be referred to by those skilled in the art as a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

In some examples, a peripheral device 135 may be a smart home system panel, for example, an interactive panel mounted on a wall or other surface in a person's home. In other examples, the peripheral device 135 may be another example of the local computing device 120 or remote computing device 140. The peripheral device 135 may be in direct communication via wired or wireless communication links 145 with the one or more sensor units 110, or may receive sensor data from the one or more sensor units 110 via the local computing device 120 and the network 125, or may receive data via the remote computing device 140, the server 155, and the network 125. Additionally or alternatively, the peripheral device 135 may wirelessly communicate with the sensor units 110 via one or more antennas.

The sensor units 110 may be dispersed throughout the security and automation system 100 and each sensor unit 110 may be stationary and/or mobile. The sensor units 110 may include and/or be one or more sensors that sense: proximity, motion, temperatures, humidity, sound level, smoke, structural features (e.g., glass breaking, window position, door position), time, light, geo-location data of a person and/or a device, distance, biometrics, weight, speed, height, size, preferences, light, darkness, weather, time, system performance, and/or other inputs that relate to a security and/or an automation system. The local computing device 120, the remote computing device 140, and/or a sensor units 110 may be able to communicate through one or more wired and/or wireless connections with various components such as a control panel, base stations, and/or network equipment (e.g., servers, wireless communication points, etc.) and/or the like.

In some examples, one or more sensor units 110 may be located within a structure, e.g., a home. Additionally or alternatively, in some examples, the structure may have a designated sensor unit located within one or more predetermined areas, e.g., one or more rooms of the home. In some cases, the one or more sensor units 110 may communicate with one another via one or more communication protocols. In some examples, the one or more sensor units 110 may form a mesh network within the structure and communicate with one another via the mesh network. In some examples, the mesh network associated with the sensor units 110 may be different or be a part of a mesh network associated with one or more control panels 135.

The wireless communication links 145 shown in the security and automation system 100 may include uplink (UL) transmissions from a local computing device 120 to a peripheral device 135, and/or downlink (DL) transmissions, from a peripheral device 135 to the local computing device 120. The downlink transmissions may also be called forward link transmissions while the uplink transmissions may also be called reverse link transmissions. Wireless communication links 145 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The wireless communication links 145 may transmit bidirectional communications and/or unidirectional communications. Wireless communication links 145 may include one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to security and/or automation systems.

In some examples, of the security and automation system 100, the peripheral device 135, the local computing device 120, and/or the remote computing device 140 may include one or more antennas for employing antenna diversity schemes to improve communication quality and reliability between the peripheral device 135, the local computing device 120, and the remote computing device 140. Additionally or alternatively, the peripheral device 135, the local computing device 120, and/or the remote computing device 140 may employ multiple-input, multiple-output (MIMO) techniques that may take advantage of multi-path, mesh-type environments to transmit multiple spatial layers carrying the same or different coded data.

While the local computing device 120 and/or the remote computing device 140 may communicate with each other through the peripheral device 135 using wireless communication links 145, the local computing device 120 and/or the remote computing device 140 may also communicate directly with one or more other devices via one or more direct communication links (not shown). Examples of direct communication links may include Wi-Fi Direct, BLUETOOTH®, wired, and/or, and other P2P group connections. The peripheral device 135, the local computing device 120, and/or the remote computing device 140 in these examples may communicate according to the WLAN radio and baseband protocol including physical and medium access control (MAC) layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within the security and automation system 100.

In an example, a local computing device 120 and a remote computing device 140 may be custom computing entities configured to interact with the sensor units 110 via network 125, and in some examples, via server 155. In other examples, the local computing device 120 and the remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. The local computing device 120 may include memory, a processor, an output, a data input and a communication module.

The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing device 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from the sensor units 110.

The processor of the local computing device 120 may be operable to control operation of the output of the local computing device 120. The output may be a television, a liquid crystal display (LCD) monitor, a cathode ray tube (CRT) monitor, speaker, tactile output device, and/or the like. In some examples, the output may be an integral component of the local computing device 120. Similarly, the output may be directly coupled to the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 120 to the output.

The remote computing device 140 may be a computing entity operable to enable a remote person to monitor the output of the sensor units 110. The remote computing device 140 may be functionally and/or structurally similar to the local computing device 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 155.

In some examples, the sensor units 110 may be sensors configured to conduct periodic or ongoing automatic measurements related to detecting an occurrence of an event. In some examples, the sensor units 110 may be configured to determine presence, occupancy, identity, and location based on a received request. Each sensor unit 110 may be capable of sensing multiple identification and/or location determining parameters, or alternatively, separate sensor units 110 may monitor separate identification and/or location determining parameters. For example, one sensor unit 110 may determine an identity of a person, while another sensor unit 110 (or, in some examples, the same sensor unit 110) may detect an occupancy of and/or location of the person.

In some examples, the sensor units 110 may be separate from the peripheral device 135 and may be positioned at various locations throughout the house or the property. In other examples, the sensor units 110 may be integrated or collocated with other house and/or building automation system components, home appliances, and/or other building fixtures. For example, a sensor unit 110 may be integrated with a doorbell or door intercom system, or may be integrated with a front entrance light fixture. In other examples, a sensor unit 110 may be integrated with a wall outlet and/or switch. In other examples, the sensor units 110 may be integrated and/or collocated with the peripheral device 135 itself. In some examples, each of the sensor units 110, peripheral device 135, and/or local computing device 120 may include a speaker unit, a microphone unit, and/or a camera unit, among other things.

In some cases, a property may be monitored by the peripheral device 135 and/or sensor units 110. In some examples, the peripheral device 135 may include sensor units 110 such that the peripheral device 135 may directly receive signals (e.g., motion sensed, entry/exit detected) associated with the property. Each sensor unit 110 may be capable of sensing multiple occupancy parameters, or alternatively, separate sensor units may monitor separate occupancy parameters. For example, one sensor unit may be a motion sensor, while another sensor unit may detect security parameters by monitoring vibration or audio. In some cases, sensor units 110 may additionally monitor alternate security and occupancy parameters, for example, by monitoring heartbeat or breathing. In some examples, occupancy may be detected by any one of a motion sensor, audio sensor, RFID sensor, video camera, light-break sensor, or a combination thereof. In some examples, the sensor units 110 may be separate from the peripheral device 135, and may be positioned at various locations, also referred to herein as zones, throughout a property. In other examples, the sensor units 110 may be integrated or collocated with other security and automation system components. For example, a sensor unit 110 may be integrated with a wall, door, window for detecting entry and/or exit of a person relative to the property. In other examples, the sensor units 110 may be integrated or collocated with the peripheral device 135 itself.

In some cases, the peripheral device 135 in communication with the sensor units 110 may receive sensor data associated with at least one sensor of a home automation system. In some examples, the peripheral device 135 may receive a trigger to perform a security function associated with a home automation system. In some examples, the security function may be instructions to arm or disarm a property (i.e., activate alarm parameters). After receiving the instructions, the peripheral device 135 may determine one or more settings associated with the security and automation system 100. In some examples, the security and/or automation system 100 may be referred to as a home automation system.

In some examples, a personnel may provide a service (e.g., perform an installation of system such as a security and automation system, sell or deliver a product, etc.). There may exist a need to provide an efficient, seamless, and verifiable survey related to the service (e.g., to provide or obtain information from a customer or a potential customer). For example, such a survey may be delivered prior to or after a service (e.g., a pre-installation survey or a post-installation survey). In some examples, local computing device 120 may be configured to display information to a user. For example, local computing device 120 may display a video survey to a customer. In such examples, local computing device 120 may receive a request to access the video survey (e.g., for a potential customer of the security and automation system). Local computing device 120 may display at least one request associated with the video survey. Additionally, local computing device 120 may record an action of receiving at least one response to the at least one request.

Figure 2:
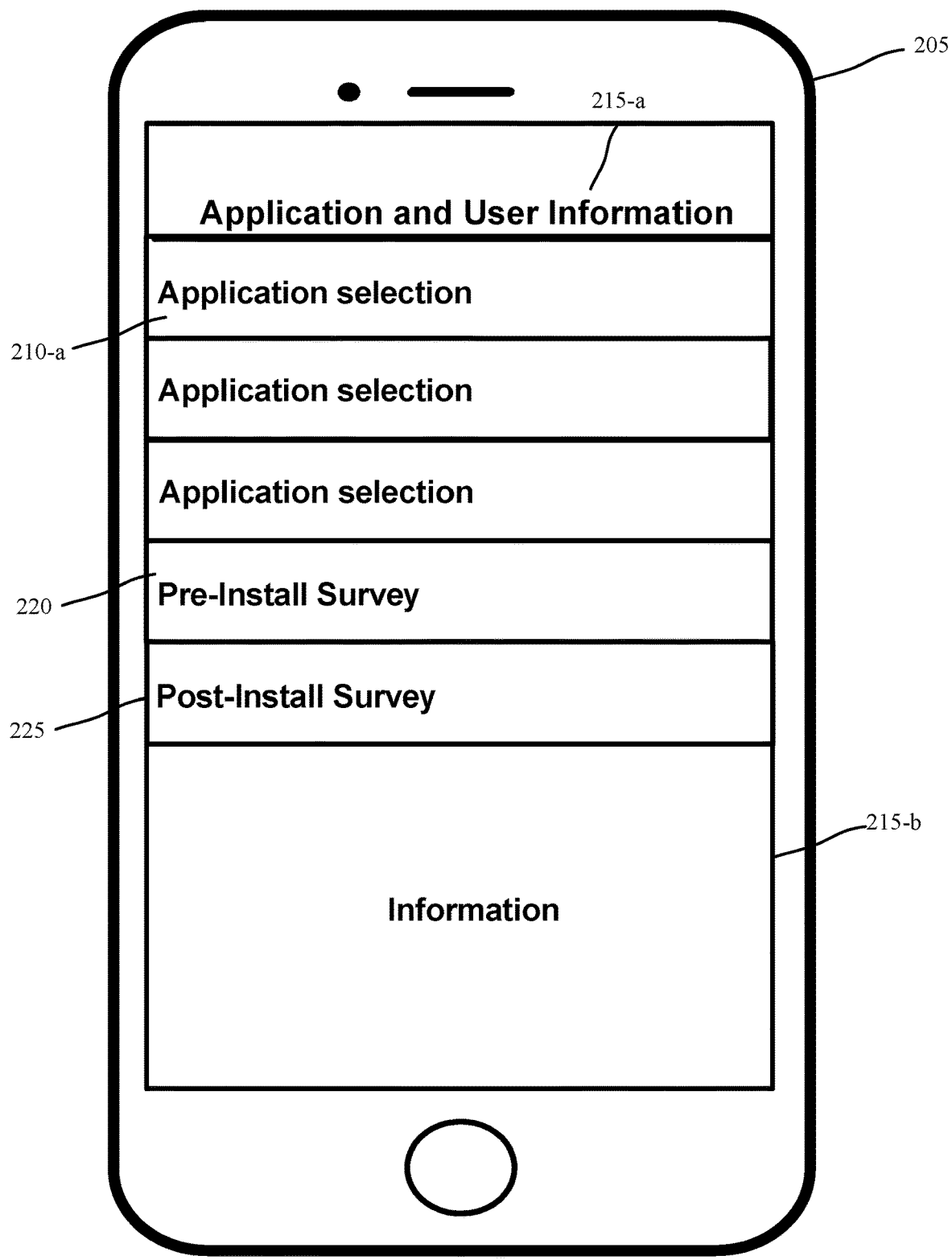
FIG. 2 illustrates an example of a user interface that supports a video survey in accordance with aspects of the present disclosure.

FIG. 2 illustrates an example of a user interface 200 that supports a video survey in accordance with aspects of the present disclosure. In some examples, the user interface 200 may implement aspects of system 100. The user interface 200 may be an application on a computing device (e.g., local computing device 120) and may enable a user to access a video survey as described herein.

As illustrated, the user interface 200 may include at least one computing device 205, which may be an example of a local computing device 120 as described above with reference to FIG. 1. For example, the user interface 200 may be displayed on the computing device 205. The user interface 200 may also include information and selection options for a user (e.g., a customer, a personnel, or the like). In some examples, the user interface 200 may display an application associated with a service. In some examples, a customer or a potential customer may choose to install a security and automation system or subsystem. In such examples, a personnel (or technician) may arrive at a home of the customer to install a system of the smart home environment (such as a security and automation system). Prior to the installation, the personnel may provide a video survey (e.g., a pre-installation survey 220 or a post-installation survey 225) to the customer. In some cases, the video survey may be included in the user interface 200.

The user interface 200 may also include various application selections 210. In some cases, the application selections 210 may be included in a mobile application associated with the service. The application selections 210 may be optional selections leading to other displays, menus, information, and/or functionalities of the application. For example, the application selection 210-a may lead to a payment information display, an agreement or contract display, a personnel dispatch menu, a customers and credit check display, and so forth.

The user interface 200 may also include other information 215. For example, information 215-a may include application and user information related to a specific computing device 120, a specific user, a service (e.g., such as a system or subsystem of a smart home environment, the sale of a product, the installation of a system, and the like), or any other user pertinent information. Likewise, information 215-b may display additional information for the user interface 200. For example, information 215-b may display further application selections 210, instructions for accessing a video survey (e.g., a pre-installation survey 220 and/or a post-installation survey 225), or any other relevant application information.

A personnel associated with the installation may make a request to access a video survey (e.g., by pressing a pre-installation survey 220 and/or a post-installation survey 225). As an example, the personnel may make a request to the computing device 205 to access a pre-installation survey 220. The pre-installation survey 220 may be a video survey completed by a potential customer prior to a service, such as an installation of a system or subsystem of a security and automation smart home environment. Additionally or alternatively, the personnel may make a request to the computing device 205 to access a post-installation survey 225. The Post-installation survey 225 may be a video survey completed by a customer after a service, such as an installation of a system or subsystem of a security and automation smart home environment.

The computing device 205 may receive the request to access the video survey for a customer. The computing device 205 may retrieve the video survey (e.g., from the computing device 205, another device, a remote server, or the like) for display to a user (e.g., a customer or potential customer). In some cases, the computing device may belong to (or be provided to) the personnel. For instance, the computing device 205 may receive a request to access pre-installation survey 220, retrieve pre-installation survey 220, and display pre-installation survey 220. Additionally or alternatively, the computing device 205 may receive a request to access post-installation survey 225, retrieve post-installation survey 225, and display post-installation survey 225.

Figure 3A:
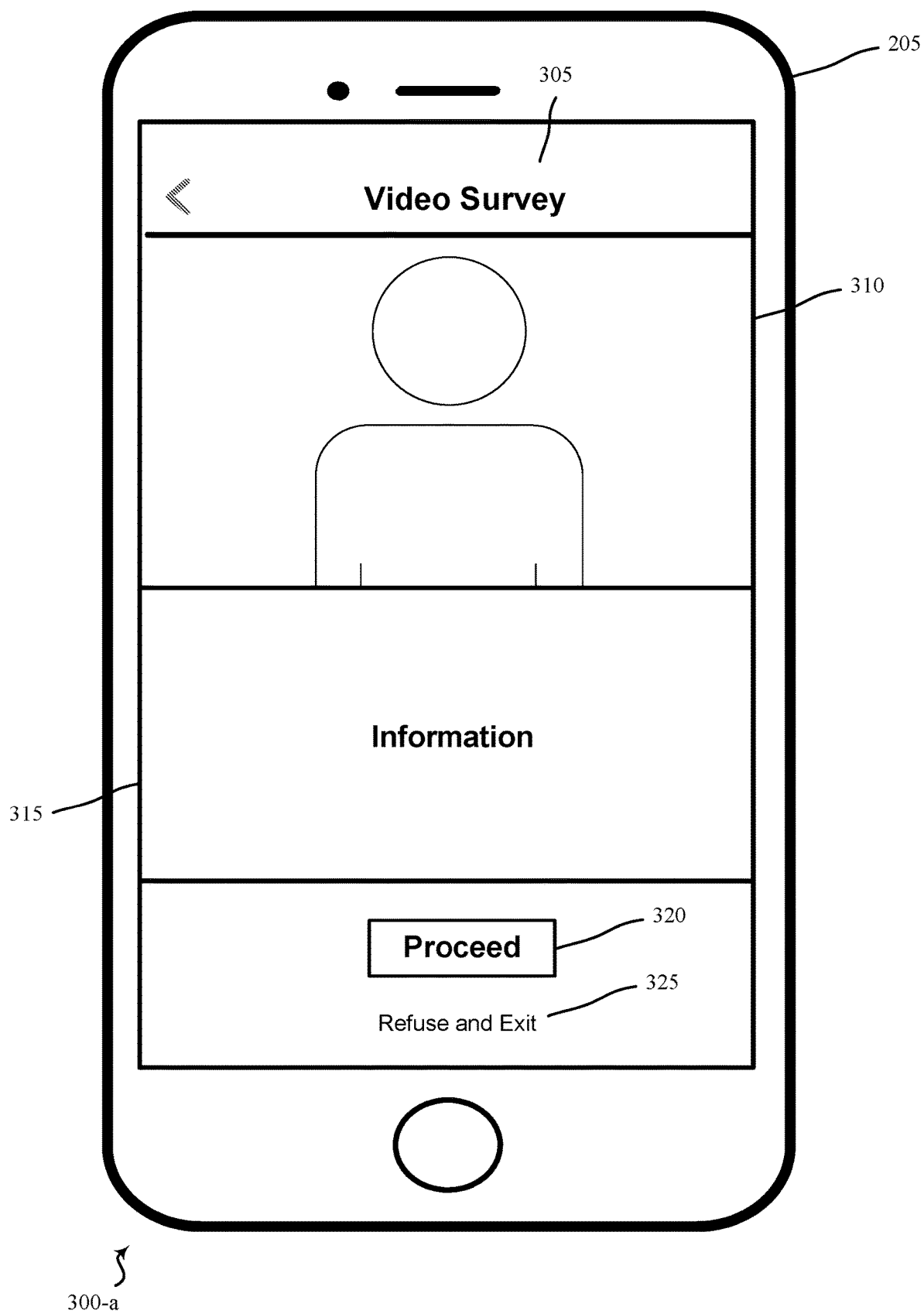
FIGS. 3A-3C illustrate examples of user interfaces that support a video survey in accordance with aspects of the present disclosure.

FIG. 3A illustrates an example of a user interface 300-*a* that supports a video survey in accordance with aspects of the present disclosure. In some examples, the user interface 300-*a* may implement aspects of system 100. For example, the user interface 300-*a* may be an application on a computing device (e.g., local computing device 120) and may enable a user to interact with a video survey.

As illustrated, the user interface 300-*a* may include at least one computing device 205, which may be an example of a local computing device 120 as described above with reference to FIG. 1. The user interface 300-*a* may be displayed on computing device 205. For example, computing device 205 may include an application including user interface 300-*a*. The application may display user interface 300-*a* (e.g., after selecting an application selection 210, the pre-installation survey 220, the post-installation survey 225, etc.) The user interface 300-*a* may also include a video survey 305. Video survey 305 may be an example of pre-installation survey 220 and/or post-installation survey 225 as discussed with reference to FIG. 2.

The user interface 300-*a* may also include a personnel display 310 and information portion 315. Personnel display 310 may display a video of a representative associated with the service. In some cases, the displayed video may provide information or instructions related to the installation of the service. For example, the displayed video may instruct a user how to provide a tactile response, a video response, an audio response, or any combination thereof. Additionally or alternatively, information portion 315 may provide information and/or instructions. In any case, the provided information may include information associated with the video survey, a request, instructions on how to respond to a request, or any combination thereof. As an example, the provided information may be a question seeking consent to record the video survey (e.g., This video survey may be recorded. Do you agree to be video recorded?). The provided information may also instruct a user (e.g., a customer) to provide a tactile response, a video response, an audio response, or any combination thereof. For instance, the provided information may instruct the user to press proceed option 320 to consent the recording of video survey 305, and display a next request. Alternatively, the user may press refuse and press exit option 325 and video survey 305 may determine to conclude and end the survey.

Figure 3B:
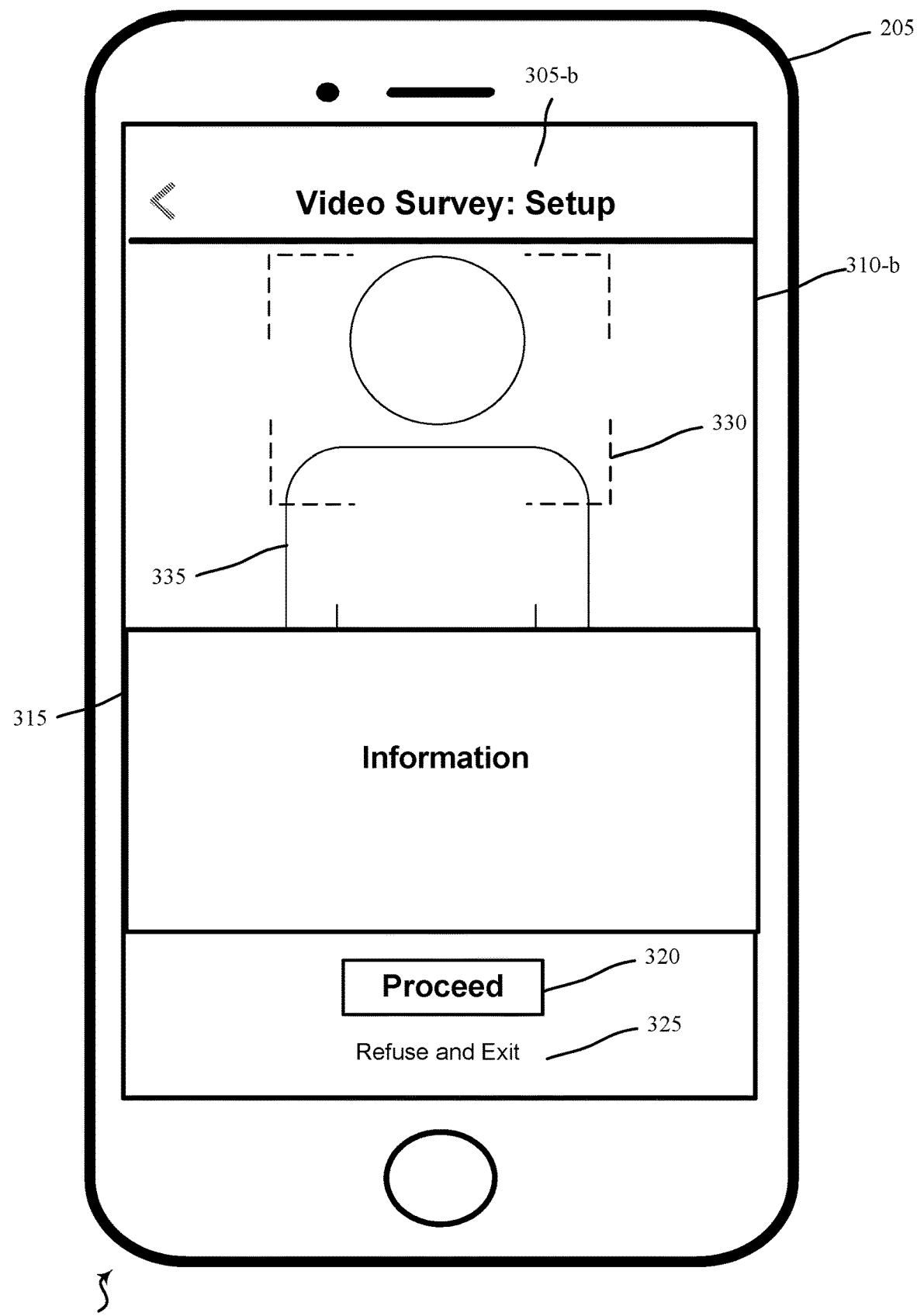

FIG. 3B illustrates an example of a the user interface 300-*b* that supports a video survey in accordance with aspects of the present disclosure. In some examples, the user interface 300-*b* may implement aspects of system 100. For example, the user interface 300-*b* may be an application on a computing device (e.g., local computing device 120) and may enable a user to interact with a video survey.

As illustrated, the user interface 300-*b* may include at least one computing device 205, which may be an example of a local computing device 120 as described above with reference to FIG. 1. The user interface 300-*b* may be displayed on computing device 205. The user interface 300-*b* may also include a video survey setup 305-*b*. The video survey setup 305-*b* may be configured to initiate video survey 305.

The user interface 300-*b* may also include a customer display 310-*b*. The customer display 310-*b* may display a video of the customer 335 associated with the service (e.g., an installation of a security and automation system). In some cases, the customer display 310-*b* may be generated in response to receiving a consent to record the video survey 305 (as described with reference to FIG. 3A). For instance, the computing device 205 may detect a face of the customer in a FOV of the camera. As illustrated, the field of view of the camera is represented visually by FOV brackets 330. In some examples, the computing device 205 may determine whether or not a face of the customer is in the FOV of the camera. For example, the computing device may detect that the face of the customer is no longer in the FOV of the camera (e.g., FOV brackets 330). In such examples, the video survey 305 may pause or conclude. Additionally or alternatively, the video survey 305 may provide instructions to return the face of the customer to the FOV of the camera. For example, the video survey 305 may resume after detecting the face of the customer returning to the camera (e.g., in FOV brackets 330).

The computing device 205 may receive a video of a customer 335 (or potential customer). The computing device 205 may then perform an image recognition analysis on the detected face. For example, the computing device 205 may verify an identity of the customer 335 based on the image recognition analysis (e.g., verifying an identity of an existing customer). In some cases, the computing device may verify the identity of the customer based on identifying one or more facial features of the customer 335. Additionally, the computing device 205 may monitor and analyze the received video of the customer 335 (e.g., to detect a positive or negative response). For example, the customer 335 (or potential customer) may answer a question by providing a gesture (e.g., a nod or a shake of the head to indicate a positive or a negative response, respectively). In some examples, the computing device 205 may identify one or more facial features of the customer 335 and identify a gesture based on the identified facial features. For example, the computing device 205 may verify a customer (in case where the customer 335 is an existing customer) and identify a nodding or shaking of the head based on the horizontal or vertical motion of a facial profile. The identified gesture (e.g., nodding or shaking of the head) may then be analyzed to determine if the gesture is a positive or a negative gesture. The video survey may interpret a positive gesture as a positive response to a survey request, and a negative gesture as a negative response to a survey request (such as a question). In some cases, the video survey may conclude based on a type of response (i.e., whether the response is positive or negative).

As described with reference to FIG. 1, an information portion 315 may provide information and/or instructions. The information portion 315 may include information associated with the video survey, a request, instructions on how to respond to a request, or any combination thereof. As an example, the information portion 315 may include instructions to look at the front of the camera such that customer 335's face is within FOV brackets 330. The information portion 315 may also instruct a user (e.g., customer 335) to provide a tactile response, a video response, an audio response, or any combination thereof. In some cases, the customer 335 (or potential customer) may choose to withdraw consent to video recording and conclude video survey. For instance, the information portion 315 may instruct the user to press proceed option 320 to consent the recording of video survey 305, and display a next request. Alternatively, the user may press refuse and press exit option 325 and video survey 305 may determine to conclude and end the survey.

In some examples, video survey setup 305-*b* may be configured to receive additional customer information for video survey 305. For example, prior to initiating the video survey 305, the customer 335 may provide video feedback to the computing device 205. As discussed above, the computing device 205 may authenticate the customer 335 based on one or more facial features. Additionally, the video survey setup 305-*b* may request (e.g., by information portion 315) to receive further customer information. Further, video survey 305-*b* may provide one or more requests to be answered by the customer 335.

Figure 3C:
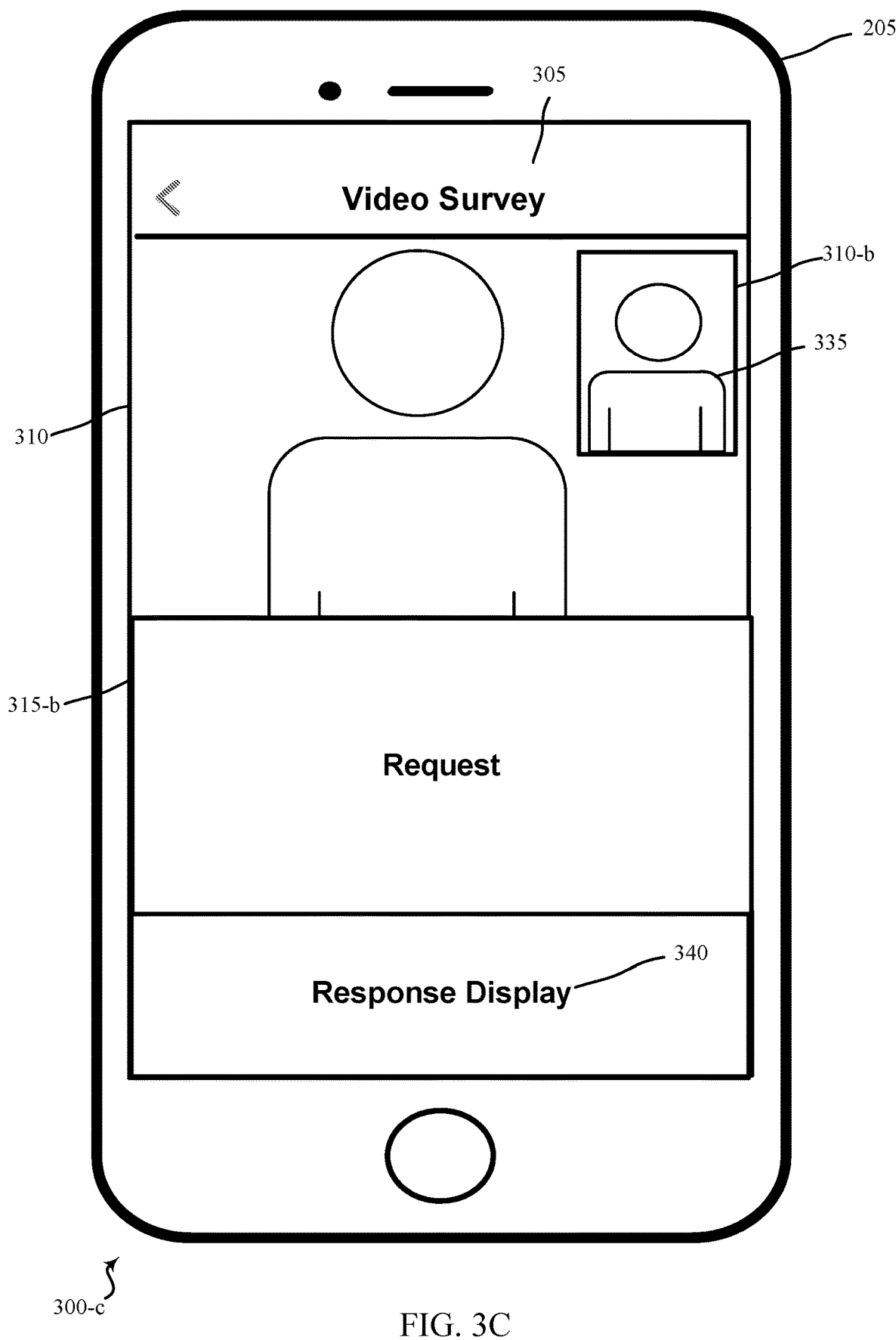

FIG. 3C illustrates an example of a user interface 300-*c* that supports a video survey in accordance with aspects of the present disclosure. In some examples, the user interface 300-*c* may implement aspects of system 100. For example, the user interface 300-*c* may be an application on a computing device (e.g., local computing device 120) and may enable a user to interact with a video survey.

As illustrated, the user interface 300-*c* may include at least one computing device 205, which may be an example of a local computing device 120 as described above with reference to FIG. 1. The user interface 300-*c* may be displayed on the computing device 205. The user interface 300-*c* may also include a video survey 305. The video survey 305 may be an example of pre-installation survey 220 and/or post-installation survey 225 as discussed with reference to FIG. 2.

The user interface 300-*c* may also include a personnel display 310. As described with reference to FIG. 3A, the personnel display 310 may display a video of a representative associated with the service. In some cases, the displayed video included in the personnel display 310 may provide information and/or instructions related to the service, such as information related to the installation of a security and automation system. In some examples, the displayed video may instruct a user how to provide a tactile response, a video response, an audio response, or any combination thereof.

Additionally or alternatively, a request portion 315-*b* may provide information or instructions related to the service, such as the installation of the security and automation system. For example, the request portion 315-*b* may include a question, information associated with the video survey, information on how to respond to a request, or any combination thereof. As an example, the provided information may be a request seeking consent to record the video survey. The provided information may also instruct a user (e.g., a customer) to provide a tactile response, a video response, an audio response, or any combination thereof. For instance, the provided information may instruct the user to press proceed option 320 to consent the recording of video survey 305, and display a next request. Alternatively, the user may press refuse and press an exit option 325 and the video survey 305 may determine to conclude and end the survey. In some cases, the video survey 305 may also conclude based on the response received from the user (such as a customer or a potential customer).

The user interface 300-*b* may also include customer display 310-*b*. As described with reference to FIG. 3B, customer display 310-*b* may display a video of the customer 335 associated with the service. For instance, the computing device 205 may detect a face of the customer 335 in a FOV of the camera. The computing device 205 may receive a video of the customer 335. In some cases, the computing device 205 may display the received video in a customer display 310-*b*. Additionally or alternatively, the computing device 205 may analyze the received video (e.g., to detect a positive or negative response as described herein).

The user interface 300-*c* may also include a request portion 315-*b*. Request portion 315-*b* may include information associated with a request from video survey 305. As discussed above, the request portion 315-*b* may include information and/or instructions (e.g., information associated with the video survey, a request, instructions on how to respond to a request, etc.). For instance, the request portion 315-*b* may display a request associated with video survey 305. Additionally or alternatively, the request portion 315-*b* may display information associated with the request (e.g., an image of a contract related to the request). In some examples, the associated request may vary depending on if video survey 305 is an example of pre-installation survey 220 or a post-installation survey 225.

In some cases, the video survey 305 may be an example of a survey provided prior to a service (e.g., pre-installation survey 220). For example, the customer 335 may receive one or more requests associated with the pre-installation survey 220. The pre-installation survey 220 may include a question seeking consent to record video survey 305. Additionally or alternatively, the pre-installation survey 220 may include a question related to a contract of the service (e.g., Has your right to cancel been explained to you and have you received a physical copy of the Notice of Cancellation?). For example, the customer 335 may receive a question related to a monthly payment of the contract and/or a question related to the duration of the contract. Additionally or alternatively, the pre-installation survey 220 may include a question related to a personnel providing a service such as installing a system (e.g., a question about an appearance of the personnel). Further, the pre-installation survey 220 may include any combination of the above questions.

In some cases, the customer 335 may receive a survey after a service (e.g., post-installation survey 225). For example, the customer 335 may receive one or more requests associated with the post-installation survey 225. The post-installation survey 225 may include a question seeking consent to record a video survey 305. Additionally or alternatively, the post-installation survey 225 may include a question asking the customer 335 to confirm receipt of one or more copies of an agreement (e.g., a contract associated with the service, such as an installed system or subsystem of the security and automation system). Additionally or alternatively, the post-installation survey 225 may include a question related to a personnel installing the system (e.g., the behavior of the personnel, whether the personnel cleaned the site of installation, etc.). Further, the post-installation survey 225 may include any combination of the above questions.

The customer 335 may provide a response to a request displayed on request portion 315-*b* (e.g., a request associated with video survey 305). For example, the customer 335 may answer a question by providing a video response. The computing device 205 may receive a video response similar to receiving video feedback as discussed with reference to FIG. 3B. In some cases, the computing device 205 may then analyze the video response. For example, the computing device 205 may monitor and analyze the received video of the customer 335 (e.g., to detect a positive or negative response). For example, the customer 335 may provide a response by providing a gesture (e.g., a nod or a shake of the head to indicate a positive response or a negative response, respectively). In some examples, the computing device 205 may identify one or more facial features of customer 335 and identify a gesture based on the identified facial features. For example, the computing device 205 may verify a customer and identify a nodding or shaking of the head based on the horizontal or vertical motion of a facial profile. The identified gesture (e.g., nodding or shaking of the head) may then be analyzed to determine if the gesture is a positive or a negative gesture. The video survey 305 may interpret a positive gesture as a positive response to a survey request (such as a question), and a negative gesture as a negative response to a survey request. In some cases, the video survey 305 may conclude based on receiving a negative response to a survey request.

The user interface 300-c may also include response display 340. Response display 340 may include information relating to a response provided by the customer 335. For example, the response display 340 may illustrate a visual representation of an audio response. Additionally or alternatively, the response display 340 may provide buttons for tactile responses (e.g., a positive response button and a negative response button).

Additionally or alternatively, customer 335 may provide a response to a request with an audio response. For example, customer 335 may answer a question by providing audio feedback (e.g., saying yes or no into an audio receiver of the computing device 205). A computing device (e.g., the computing device 205 displaying the survey) may receive the audio response and analyze the response using voice recognition. Based on the analysis of the response, the computing device 205 may interpret the audio response as a positive or a negative response to the request. In some cases, the computing device 205 may identify a tone of the audio response based on voice recognition techniques. For example, the computing device may receive an audio response and perform an analysis on the response. The analysis may recognize a positive word (e.g., "yes," "sure," "I agree," etc.) and identify a positive response based on the recognition. Additionally or alternatively, the analysis may recognize a negative word (e.g., "no," "nope," "I do not agree," etc.) and identify a negative response based on the recognition. In some cases, the computing device may transmit a copy of the audio response to a cloud-based server. For example, instead of analyzing the response at the computing device, the computing device may receive the analysis from the cloud-based server. In some cases, the video survey may conclude based on the tone of the audio response (i.e., whether the response is positive or negative).

Additionally or alternatively, the customer 335 may provide a response to a request with a tactile response. For example, the customer 335 may answer a question by providing tactile feedback. In some examples, the customer 335 may touch a displayed button on a computing device indicating a positive response or a negative response. The computing device 205 may detect whether the customer 335 has touched a positive response or a negative response, and may determine that a survey request has been answered accordingly.

In some cases, the video survey 305 may conclude or proceed based on a received response. For example, the customer 335 may provide a response to a request (or question) of the video survey 305. The video survey 305 may determine whether the response was a positive response or a negative response. The video survey 305 may determine to conclude or proceed based on the response. For example, the customer 335 may be asked whether they understand the terms of the installation in a video survey. If the customer 335 provides a positive response, the video survey 305 may proceed and display another question (e.g., on request portion 315-b). If the customer 335 provides a negative response, the video survey 305 may conclude. In some examples, the video survey 305 may conclude if the customer 335 provides a positive response (e.g., if there are no more questions to display). In other examples, the video survey 305 may proceed and display another question if the customer 335 provides a negative response.

In some cases, the video survey 305 may record an action associated with a response. For example, the customer 335 may perform an action to indicate a response (e.g., a video response, an audio response, and/or a tactile response), and the video survey 305 may record the action. In some cases, the computing device 205 performing the video survey may store the recording (e.g., in a device, on a remote server, or the like).

In some cases, a service, such as an installed system or subsystem of the security and automation system, may be associated with a contract. The contract may detail a customer agreement related to the installation. For example, the contract may detail a monthly payment and a duration of the contract. As part of responding to the questions in the video survey 305, the customer 335 may agree to the terms of the contract to proceed with the installation. In some cases, the contract may be associated with a duration. In some cases, the computing device 205 performing the video survey 305 may store the video survey 305 (e.g., on the device, on a remote server, or the like). According to some instances, the video survey 305 may be stored for the duration of the contract and may be deleted once the contract duration has ended. Additionally or alternatively, the video survey may be stored for the duration of the contract and may be deleted if the contract is not renewed within a threshold period after expiration of the contract.

Figure 4:
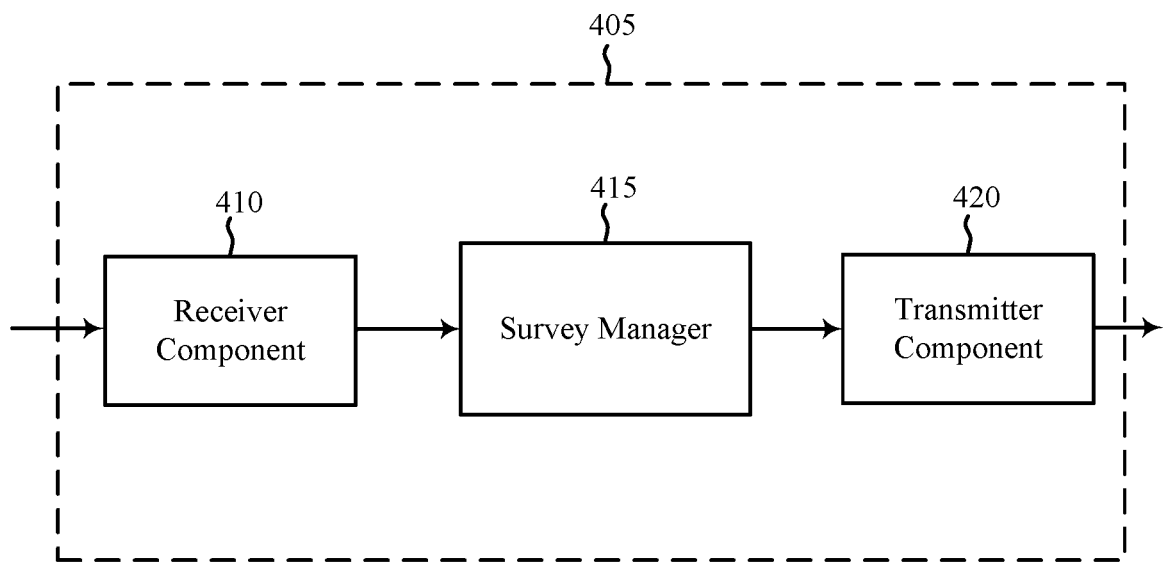
FIG. 4 illustrates an example of a user interface that supports a video survey in accordance with aspects of the present disclosure.

FIG. 4 shows a block diagram 400 of an example apparatus 405 relating to a video survey, in accordance with one or more examples of the present disclosure. The apparatus 405 may be an example of one or more examples of a computing device 120 described with reference to FIG. 1. The apparatus 405 may be an example of one or more examples of a computing device 205 described with reference to FIGS. 2 and 3A-3C. The apparatus 405 may include a receiver component 410, a survey manager 415, and/or a transmitter component 420. The apparatus 405 may also be or include a processor. Each of these components or modules may be in communication with each other—directly and/or indirectly.

In one example, where apparatus 405 is a computing device, apparatus 405 may be a computing device in the form of an interactive home automation system display. In some examples, apparatus 405 may be a local computing device 120 such as a personal computer or portable electronic device (e.g., smart phone, smart watch, tablet computer). In some examples, apparatus 405 may be coupled to at least one sensor unit 110. The components of the apparatus 405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 410 may receive information such as packets, user data, and/or control information associated with various information channels (e.g., control channels, data channels, etc.). In some examples, the receiver component 410 may be configured to receive instructions at the apparatus 405. In one example, the receiver component 410 may be configured to receive an instruction from local computing device 120 and/or remote computing device 140. In some examples, the received instruction may be in the form of a video input, verbal command, and/or a tactile input. In further examples, the receiver component 410 may receive identification information, location information and/or authentication credentials from the sensor units 110, local computing device 120, remote computing device 140, and/or server 155. In some examples, information (e.g., authentication credentials, location information) may be passed on to the survey manager 415, and to other components of the apparatus 405.

The survey manager 415 may receive a request to access the video survey for a customer, display, at the computing device, at least one request associated with the video survey, record, by a camera included in the computing device, an action of receiving a response to the at least one request associated with the video survey, where the response is received from the customer, and conclude the video survey based on the response to the at least one request.

The transmitter component 420 may transmit the one or more signals received from other components of the apparatus 405. The transmitter component 420 may transmit information collected by sensors such as videos, actions, audio responses, tactile responses, information associated with a video survey, and the like. In some examples, the transmitter component 420 may be collocated with the receiver component 410 in a transceiver module.

Figure 5:
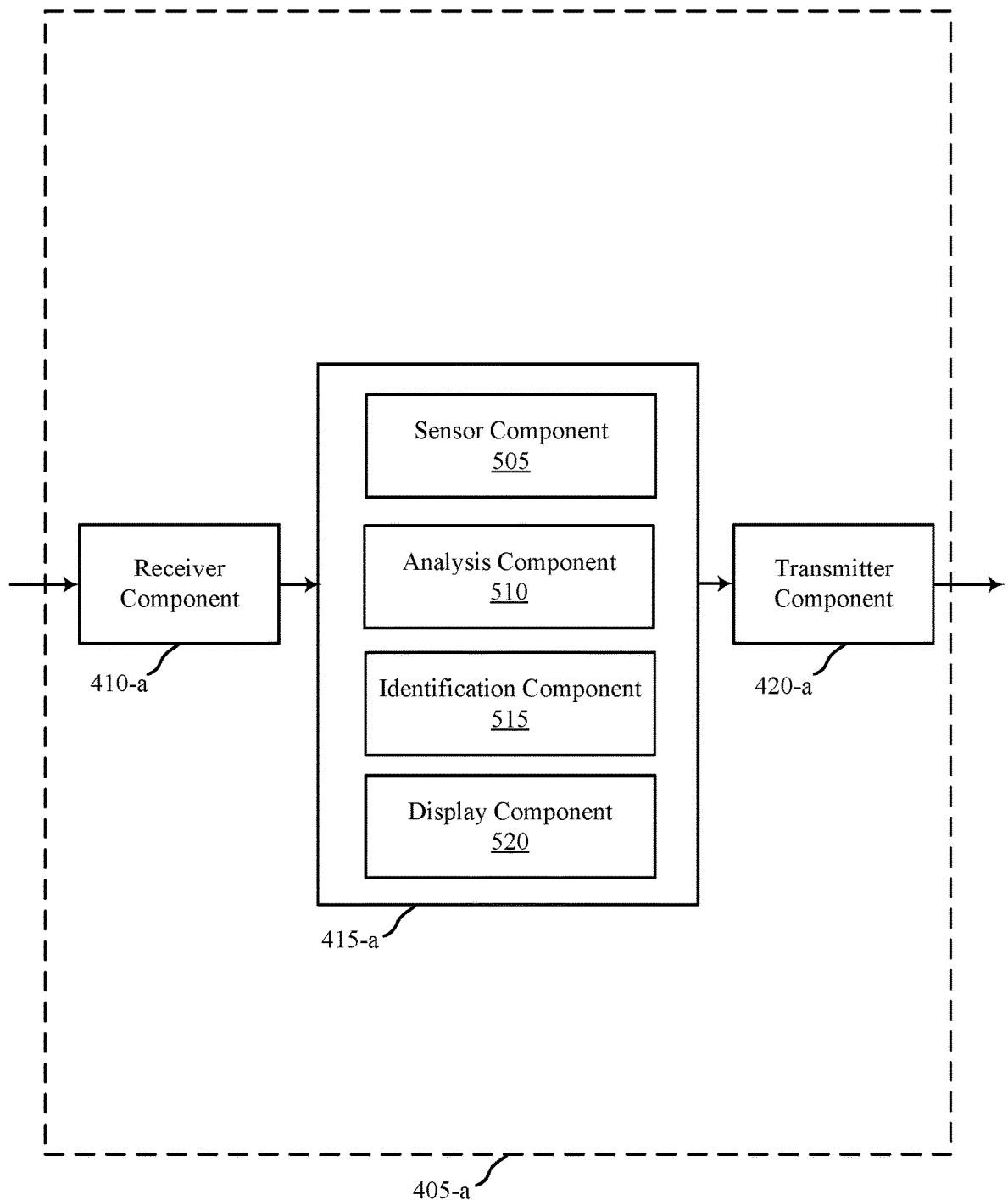
FIG. 5 illustrates a block diagram of an example apparatus relating to a video survey, in accordance with aspects of the present disclosure.

FIG. 5 shows a block diagram 500 of an example apparatus 405-*a* relating to a video survey, in accordance with one or more examples of the present disclosure. The apparatus 405-*a* may be an example of one or more examples of a local computing device 120, remote computing device 140, peripheral device 135 described with reference to FIG. 1. The apparatus 405-*a* may include a receiver component 410-*a*, a survey manager 415-*a*, and/or a transmitter component 420-*a*. The apparatus 405-*a* may also be or include a processor. In some examples, apparatus 405-*a* may be an example of apparatus 405 described with reference to FIG. 4. Each of these components or modules may be in communication with each other—directly and/or indirectly. In some examples, where apparatus 405-*a* is a control panel, apparatus 405-*a* may be a control panel in the form of an interactive home automation system display. In some examples, apparatus 405-*a* may be a local computing device 120 such as a personal computer or portable electronic device (e.g., smart phone, smart watch, tablet computer). In some examples, apparatus 405-*a* may be coupled to at least one sensor unit 110.

In some examples, survey manager 415-*a* may be an example of survey manager 415 described with reference to FIG. 4. In some examples, survey manager 415-*a*, may include a sensor component 505, an analysis component 510, an identification component 515, and a display component 520.

The components of the apparatus 405-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver component 410-*a* may receive information such as packets, user data, and/or control information associated with various information channels (e.g., control channels, data channels, etc.). In some examples, the receiver component 410-*a* may be configured to receive instructions at the apparatus 405-*a*. In one example, the receiver component 410-*a* may be configured to receive an instruction from local computing device 120 and/or remote computing device 140. In some examples, the received instruction may be in the form of a video input, verbal command, and/or a tactile input. In further examples, the receiver component 410-*a* may receive identification information, location information and/or authentication credentials from the sensor units 110, local computing device 120, remote computing device 140, and/or server 155. In some examples, information (e.g., authentication credentials, location information, video information) may be passed on to the survey manager 415-*a*, and to other components of the apparatus 405-*a*.

In some examples, the sensor component 505 may receive sensor data (e.g., from receiver component 410-*a*). In some examples, the sensor data includes data received from a sensor associated with a computing device, a camera, a motion sensor, a control panel, or a combination thereof. In some examples, sensor component 505 may receive sensor data associated with a response. In such examples, sensor component 505 may receive a request to access the video survey (e.g., where the video survey may include at least one of a survey provided prior to a service, a survey provided after a service, or a combination thereof) for a customer of the service. Additionally, sensor component 505 (e.g., when sensor component 505 includes a camera included in the computing device) may record an action of receiving a response.

In some examples, the sensor component 505 may receive one or more types of sensor data. Sensor component 505 may receive a response that includes a video response, an audio response, a tactile response, or a combination thereof. In some examples, the sensor component 505 may receive (e.g., at a camera included in the computing device) a video of a customer. For example, the customer may be within a FOV of the camera and sensor component 505 may receive a video of the customer. Additionally or alternatively, sensor component 505 may receive an audio response or command from the customer. Additionally or alternatively, sensor component 505 may receive a tactile response from the customer. Further, sensor component 505 may receive any combination of these responses.

In some examples, the sensor component 505 may record (e.g., by a camera included in the computing device) an action of receiving a response (e.g., by a customer) to at least one request associated with a video survey.

In some examples, the sensor component 505 may receive, from the potential customer or customer of the service, the audio response to the at least one request associated with the video survey. In some examples, analysis component 510 may analyze the audio response (e.g., received from sensor component 505) to determine whether the audio response is a positive response to the at least one request or a negative response to the at least one request, where concluding the video survey is based on the analyzing.

In some examples, the sensor component 505 may receive, from the customer, a tactile response to the at least one request included in the video survey. The analysis component 510 may analyze the tactile response (e.g., received by sensor component 505) to determine whether the tactile response includes a selection of the first answer or the second answer, where concluding the video survey is based on the analyzing.

In some examples, the analysis component 510 may receive a request to access the video survey for a customer of the service (e.g., a service associated with installation of a security and automation system). The analysis component 510 may also receive a response to at least one request associated with the video survey (e.g., from sensor component 505). The analysis component 510 may conclude a video survey based on the response to at least one request. In some examples, the analysis component 510 may analyze a gesture (e.g., the identified gesture from identification component 515) and determine whether the gesture is a positive gesture or a negative gesture, where concluding the video survey is based on the analyzing.

In some examples, the analysis component 510 may determine that a predetermined number of requests associated with the video survey has been displayed at the computing device (e.g., by display component 520). Analysis component 510 may generate an account associated with the customer of the service (e.g., the security and automation system) based on the determining. In some examples, analysis component 510 may conclude the video survey based on the determining, the generating, or both.

In some examples, the analysis component 510 may determine a duration of a contract associated with the customer based on concluding the video survey. Analysis component 510 may store the video survey for the duration of the contract associated with the customer.

In some examples, identification component 515 may receive (e.g., from sensor component 505 when sensor component 505 includes a camera included in apparatus 405-*a*) a video of a customer or a potential customer. The identification component 515 may detect a face of the customer in a FOV. The identification component 515 may perform an image recognition analysis on the detected face, where receiving a video response to the at least one request is based on the image recognition analysis. In some examples, identification component 515 may identify one or more facial features of the customer based on the image recognition analysis. In some examples, identification component 515 may detect a face of the customer in a field-of-view of the camera, perform an image recognition analysis on the detected face, and identify one or more facial features of the person based on the analysis. Further, identification component 515 may identify a gesture associated with the video response to the at least one question included in the video survey, where the gesture is identified based on the one or more facial features.

In some examples, display component 520 may display, at apparatus 405-*a*, at least one request associated with the video survey. Display component 520 may also display, on a first portion of a display of apparatus 405-*a*, a video of a representative associated with the service. Display component 520 may also display, on a second portion of the display of the computing device, the at least one request and one or more instructions to respond to the at least one request.

In some examples, display component 520 may also display a first answer to the at least one request and a second answer to the at least one request, where the first answer is a positive response to the at least one request and the second answer is a negative response to the at least one request.

In some examples, display component 520 may display at least one request associated with a survey provided prior to a service (e.g., a pre-installation survey). The at least one request may include a question to seek consent to record the video survey, a question related to a monthly payment associated with the service (e.g., a security and home automation system), a question related to a duration of a contract associated with the service, a question related to an appearance of a personnel associated with the service, or a combination thereof.

In some examples, display component 520 may display at least one request associated with a survey provided after a service (e.g., a post-installation survey). The at least one request may include a question to seek consent to record the video survey, a question related to receiving one or more copies of an agreement associated with the service (e.g., a security and automation system), a question related to a behavior of a personnel associated with the service, or a combination thereof.

The transmitter component 420-*a* may transmit the one or more signals received from other components of the apparatus 405-*a*. The transmitter component 420-*a* may transmit information collected by sensors such as actions or behaviors, times of entry or exits associated with a structure and/or a property, and the like. In some examples, the transmitter component 420-*a* may be collocated with the receiver component 410-*a* in a transceiver module.

In some examples, the transmitter component 420-*a* or the receiver component 410-*a* may retrieve the video survey for the customer in response to receiving the request (e.g., a request to access the video survey). In such examples, display component 520 may display at least one question based on the retrieving (e.g., retrieving the video survey).

Figure 6:
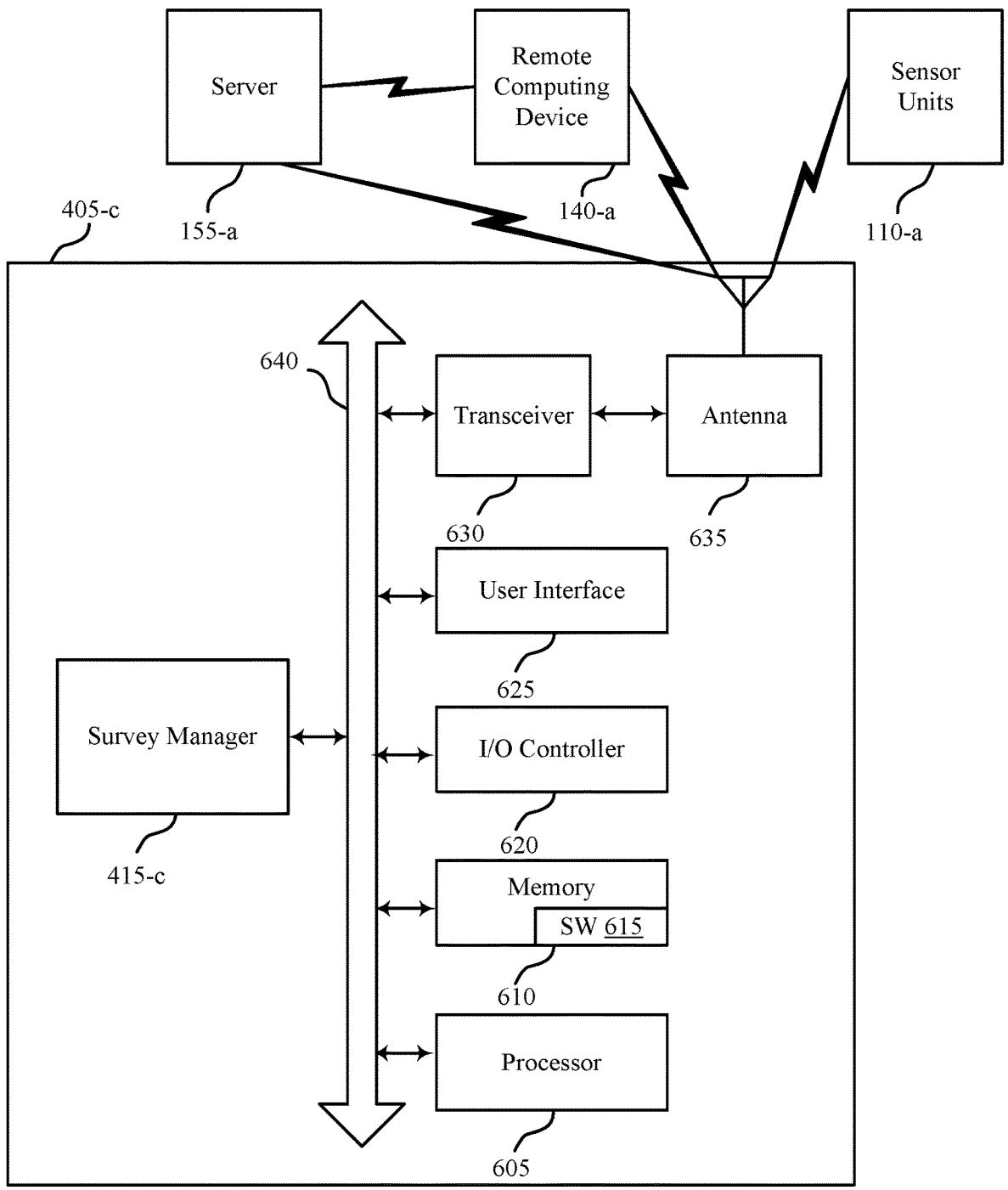
FIG. 6 illustrates a block diagram of an example apparatus relating to a video survey, in accordance with aspects of the present disclosure.

FIG. 6 shows a block diagram 600 of an apparatus 405-*c* relating to a video survey, in accordance with one or more examples of the present disclosure. Apparatus 405-*c* may be an example of the peripheral device 135, local computing device 120, remote computing device 140, and/or the sensor units 110 of FIG. 1. In some examples, apparatus 405-*c* may also be an example of one or more examples of apparatus 405 and/or 405-*a* with reference to FIGS. 4 and 5. Apparatus 405-*c* may include a survey manager 415-*c*, which may be an example of the survey manager 415 and/or 415-*a* with reference to FIGS. 4 and 5. The survey manager 415-*c* may provide for techniques that support video surveys, as described above with reference to FIGS. 1-3C.

Apparatus 405-*c* may also include components for bi-directional data communications including components for transmitting communications and components for receiving communications. For example, apparatus 405-*c* may communicate bi-directionally with remote computing device 140-*a*, server 155-*a*, or sensor units 110-*a*. This bi-directional communication may be direct (e.g., apparatus 405-*c* communicating directly with sensor units 110-*a* or remote computing device 140-*a*) or indirect (e.g., apparatus 405-*c* communicating with remote computing device 140-*a* via server 155-*a*). Server 155-*a*, remote computing device 140-*a*, and sensor units 110-*a* may be examples of server 155, remote computing device 140, and sensor units 110 as shown with respect to FIG. 1.

Apparatus 405-*c* may also include a processor 605, and memory 610 (including software (SW) 615), an input/output (I/O) controller 620, a user interface 625, a transceiver 630, and one or more antennas 635, each of which may communicate—directly or indirectly—with one another (e.g., via one or more buses 640). The transceiver 630 may communicate bi-directionally—via the one or more antennas 635, wired links, and/or wireless links—with one or more networks or remote devices as described above. For example, the transceiver 630 may communicate bi-directionally with one or more of server 155-a or sensor unit 110-a. The transceiver 630 may include a modem to modulate the packets and provide the modulated packets to the one or more antennas 635 for transmission, and to demodulate packets received from the one or more antennas 635. While an apparatus 405-c may include a single antenna 635, the apparatus may also have multiple antennas 635 capable of concurrently transmitting or receiving multiple wired and/or wireless transmissions. In some examples, one element of apparatus 405-c (e.g., one or more antennas 635, transceiver 630, etc.) may provide a direct connection to a server 155-a via a direct network link to the Internet via a POP (point of presence). In some examples, one element of apparatus 405-c (e.g., one or more antennas 635, transceiver 630, etc.) may provide a connection using wireless techniques, including digital cellular telephone connection, Cellular Digital Packet Data (CDPD) connection, digital satellite data connection, and/or another connection.

The signals associated with apparatus 405-c, server 155-a, remote computing device 140-a, and/or sensor unit 110-a may include wireless communication signals such as radio frequency, electromagnetics, local area network (LAN), wide area network (WAN), virtual private network (VPN), wireless network (using 802.11, for example), 345 MHz, Z Wave, cellular network (using 3G and/or LTE, for example), and/or other signals. The one or more antennas 635 and/or transceiver 630 may include or be related to, but are not limited to, wireless wide area network (WWAN) (GSM, CDMA, and WCDMA), WLAN (including Bluetooth and Wi-Fi), WMAN (WiMAX), antennas for mobile communications, antennas for Wireless Personal Area Network (WPAN) applications (including RFID and ultra-wideband (UWB)). In some examples, each antenna 635 may receive signals or information specific and/or exclusive to itself. In other examples each antenna 635 may receive signals or information neither specific nor exclusive to itself.

In some examples, the user interface 625 may include an audio device, such as an external speaker system, a visual device such as a camera or video camera, an external display device such as a display screen, and/or an input device (e.g., remote control device interfaced with the user interface 625 directly and/or through I/O controller 620). In some examples, one or more buses 640 may allow data communication between one or more elements of apparatus 405-c (e.g., processor 605, memory 610, I/O controller 620, user interface 625, etc.).

The memory 610 may include RAM), read only memory (ROM), flash RAM, and/or other types. The memory 610 may store computer-readable, computer-executable software/firmware code 615 including instructions that, when executed, cause the processor 605 to perform various functions described in this disclosure (e.g., receiving a request, displaying a request, recording an action of receiving a response, etc.). Alternatively, the computer-executable software/firmware code 615 may not be directly executable by the processor 605 but may cause a computer (e.g., when compiled and executed) to perform functions described herein.

In some examples the processor 605 may include, among other things, an intelligent hardware device (e.g., a central processing unit (CPU), a microcontroller, and/or an ASIC, etc.). The memory 610 may contain, among other things, the Basic Input-Output system (BIOS) which may control basic hardware and/or software operation such as the interaction with peripheral components or devices. For example, the survey manager 415-c may be stored within the memory 610. Applications resident with apparatus 405-c are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver 630, one or more antennas 635, etc.).

Many other devices and/or subsystems may be connected to, or may be included as, one or more elements of apparatus 405-c (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some examples, all of the elements shown in FIG. 6 need not be present to practice the present systems and methods. The devices and subsystems can be interconnected in different ways from that shown in FIG. 6. In some examples, an example of some operation of a system, such as that shown in FIG. 6, may be readily known in the art and is not discussed in detail in this disclosure. Code to implement the present disclosure may be stored in a non-transitory computer-readable medium such as one or more of memory 610 or other memory. The operating system provided on I/O controller 620 may be iOS®, ANDROID®, MS-dOS®, MS-WINDOWS®, OS/2®, UNIX®, LINUX®, or another known operating system.

The components of the apparatus 405-c may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 7:
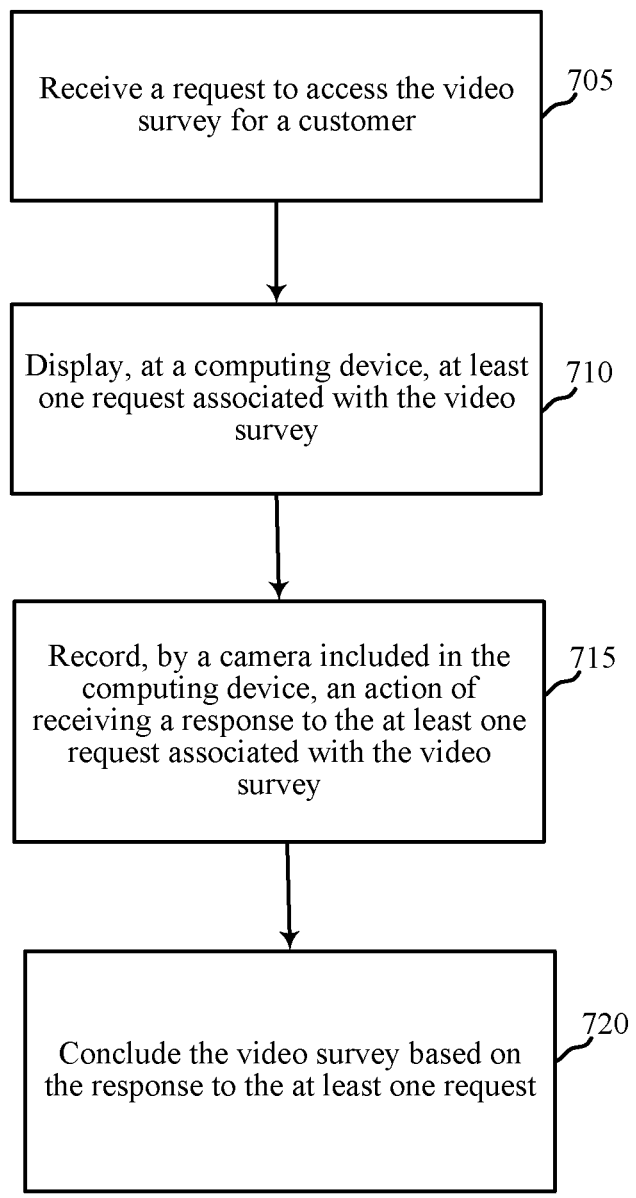
FIG. 7 is a flow chart illustrating an example of a method relating to a video survey, in accordance with aspects of the present disclosure.

FIG. 7 is a flow chart illustrating an example of a method 700 relating to a video survey, in accordance with one or more examples of the present disclosure. For clarity, the method 700 is described below with reference to examples of one or more of the sensor units 110, local computing device 120, peripheral device 135, and/or remote computing device 140 as described with reference to at least FIG. 1. In addition, method 700 is described below with reference to examples of one or more of the apparatus 405-a, 405-b, or 405-c described with reference to at least FIGS. 4-6. In some examples, peripheral device 135, local computing device 120, and/or sensor units 110 may execute one or more sets of codes to control the functional elements described below. Additionally or alternatively, the peripheral device 135, local computing device 120, and/or sensor units 110 may perform one or more of the functions described below using special-purpose hardware.

At block 705, the method 700 may include receiving a request to access a video survey for a customer. The operation at block 705 may be performed using the survey manager 415, peripheral device 135, sensor units 110, or apparatus 405, described with reference to FIGS. 1-6. In some examples, the operation at block 705 may be performed, additionally or alternatively, using the sensor component 505 as described with reference to FIG. 5.

At block 710, the method 700 may include displaying, at a computing device, at least one request associated with the video survey. The operation at block 710 may be performed using the survey manager 415, peripheral device 135, sensor units 110, or apparatus 405, described with reference to FIGS. 1-6. In some examples, the operation at block 710 may be performed, additionally or alternatively, using the analysis component 510 as described with reference to FIG. 5.

At block 715, the method 700 may include recording, by a camera included in the computing device, an action of receiving a response to the at least one request associated with the video survey. In some cases, the response is received from the customer. The operation at block 710 may be performed using the survey manager 415, peripheral device 135, sensor units 110, or apparatus 405, described with reference to FIGS. 1-6. In some examples, the operation at block 715 may be performed, additionally or alternatively, using the analysis component 510 as described with reference to FIG. 5.

At block 720, the method 700 may include concluding the video survey based on the response to the at least one request. The operation at block 720 may be performed using the survey manager 415, peripheral device 135, sensor units 110, or apparatus 405, described with reference to FIGS. 1-6. In some examples, the operation at block 720 may be performed, additionally or alternatively, using the analysis component 510 as described with reference to FIG. 5.

Figure 8:
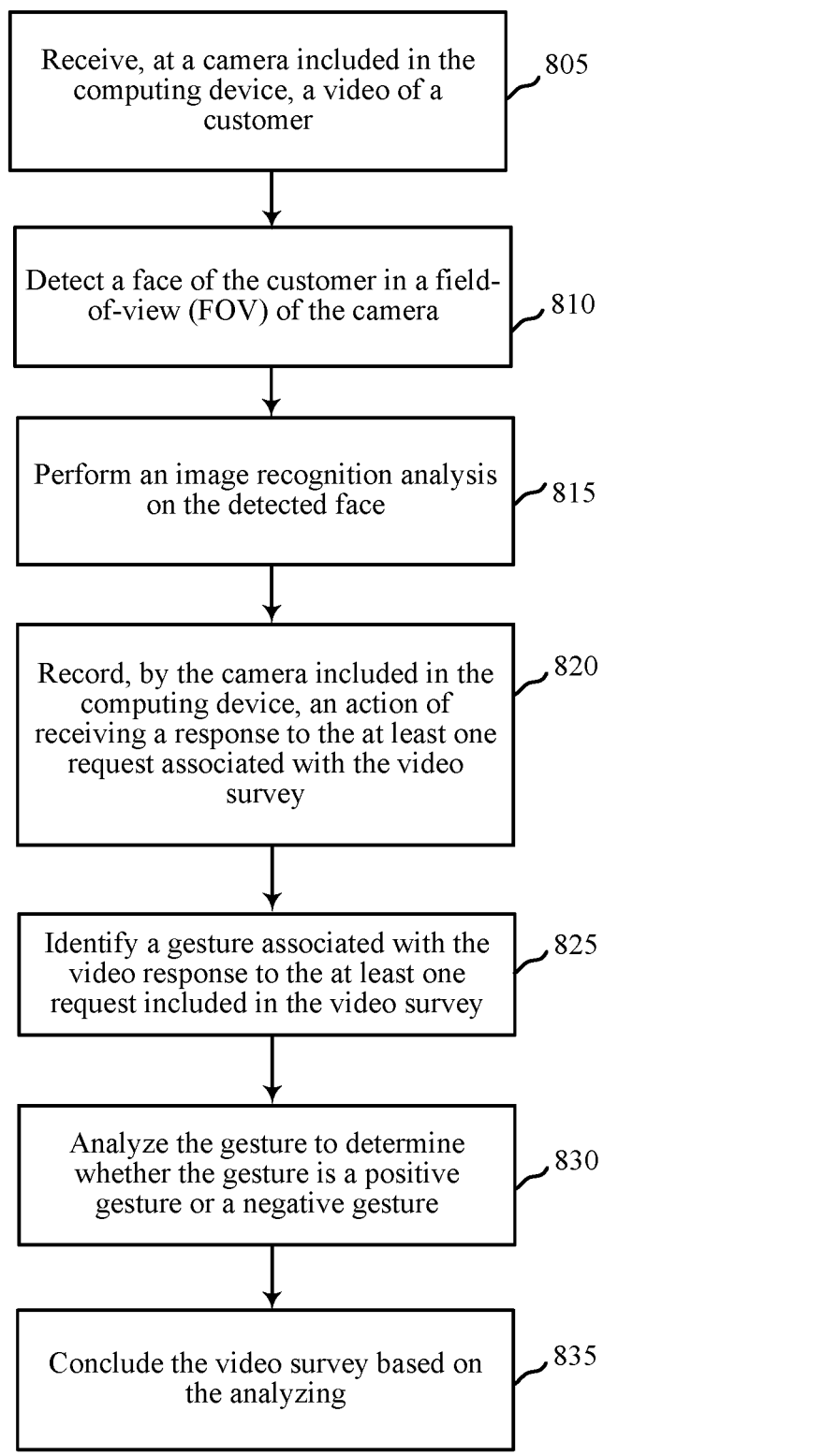
FIG. 8 is a flow chart illustrating an example of a method relating to a video survey, in accordance with aspects of the present disclosure.

FIG. 8 is a flow chart illustrating an example of a method 800 relating to a video survey, in accordance with one or more examples of the present disclosure. For clarity, the method 800 is described below with reference to examples of one or more of the sensor units 110, local computing device 120, peripheral device 135, and/or remote computing device 140 as described with reference to at least FIG. 1. In addition, method 800 is described below with reference to examples of one or more of the apparatus 405-a, 405-b, or 405-c described with reference to at least FIGS. 4-6. In some examples, peripheral device 135, local computing device 120, and/or sensor units 110 may execute one or more sets of codes to control the functional elements described below. Additionally or alternatively, the peripheral device 135, local computing device 120, and/or sensor units 110 may perform one or more of the functions described below using special-purpose hardware.

At block 805, the method 800 may include receiving, at a camera included in the computing device, a video of a customer. The operation at block 805 may be performed using the survey manager 415, peripheral device 135, sensor units 110, or apparatus 405, described with reference to FIGS. 1-6. In some examples, the operation at block 805 may be performed, additionally or alternatively, using the sensor component 505 as described with reference to FIG. 5.

At block 810, the method 800 may include detecting a face of the customer in a FOV of the camera. The operation at block 805 may be performed using the survey manager 415, peripheral device 135, sensor units 110, or apparatus 405, described with reference to FIGS. 1-6. In some examples, the operation at block 805 may be performed, additionally or alternatively, using the analysis component 510 as described with reference to FIG. 5.

At block 815, the method 800 may include performing an image recognition analysis on the detected face. In some cases, receiving a video response to at least one request may be based on the image recognition analysis. The operation at block 815 may be performed using the survey manager 415, peripheral device 135, sensor units 110, or apparatus 405, described with reference to FIGS. 1-6. In some examples, the operation at block 815 may be performed, additionally or alternatively, using the analysis component 510 as described with reference to FIG. 5.

At block 820, the method 800 may include recording, by the camera included in the computing device, an action of receiving a response to the at least one request associated with the video survey, where the response is received from the customer (e.g., a potential customer of the security and automation system). In some cases, the response to the at least one request includes at least one of a video response, an audio response, a tactile response, or a combination thereof. The operation at block 820 may be performed using the survey manager 415, peripheral device 135, sensor units 110, or apparatus 405, described with reference to FIGS. 1-6. In some examples, the operation at block 820 may be performed, additionally or alternatively, using the sensor component 505 as described with reference to FIG. 5.

At block 825, the method 800 may include identifying a gesture associated with the video response to the at least one request included in the video survey. In some examples, the gesture is identified based on one or more facial features (e.g., based on an image recognition analysis). The operation at block 825 may be performed using the survey manager 415, peripheral device 135, sensor units 110, or apparatus 405, described with reference to FIGS. 1-6. In some examples, the operation at block 825 may be performed, additionally or alternatively, using the analysis component 510 as described with reference to FIG. 5.

At block 830, the method 800 may include analyzing the gesture to determine whether the gesture is a positive gesture or a negative gesture. The operation at block 830 may be performed using the survey manager 415, peripheral device 135, sensor units 110, or apparatus 405, described with reference to FIGS. 1-6. In some examples, the operation at block 830 may be performed, additionally or alternatively, using the analysis component 510 as described with reference to FIG. 5.

At block 835, the method 800 may include concluding the video survey based on the analyzing (e.g., at block 830). The operation at block 835 may be performed using the survey manager 415, peripheral device 135, sensor units 110, or apparatus 405, described with reference to FIGS. 1-6. In some examples, the operation at block 835 may be performed, additionally or alternatively, using the analysis component 510 as described with reference to FIG. 5.

Figure 9:
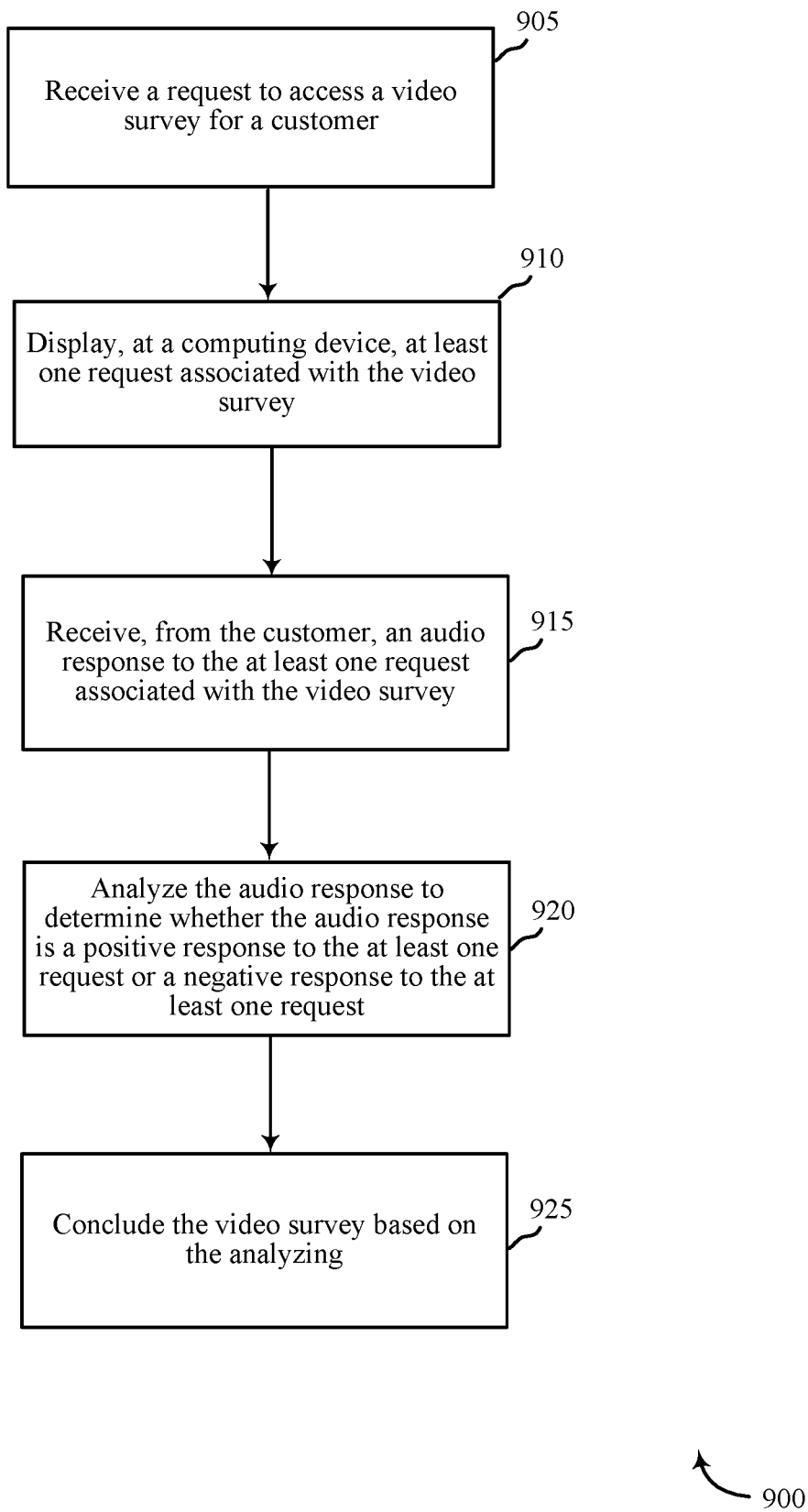
FIG. 9 is a flow chart illustrating an example of a method relating to a video survey, in accordance with aspects of the present disclosure.

FIG. 9 is a flow chart illustrating an example of a method 900 relating to a video survey, in accordance with one or more examples of the present disclosure. For clarity, the method 900 is described below with reference to examples of one or more of the sensor units 110, local computing device 120, peripheral device 135, and/or remote computing device 140 as described with reference to at least FIG. 1. In addition, method 900 is described below with reference to examples of one or more of the apparatus 405-a, 405-b, or 405-c described with reference to at least FIGS. 4-6. In some examples, peripheral device 135, local computing device 120, and/or sensor units 110 may execute one or more sets of codes to control the functional elements described below.

Additionally or alternatively, the peripheral device 135, local computing device 120, and/or sensor units 110 may perform one or more of the functions described below using special-purpose hardware.

At block 905, the method 900 may include receiving a request to access a video survey for a customer. The operation at block 905 may be performed using the survey manager 415, peripheral device 135, sensor units 110, or apparatus 405, described with reference to FIGS. 1-6. In some examples, the operation at block 905 may be performed, additionally or alternatively, using the analysis component 510 as described with reference to FIG. 5.

At block 910, the method 900 may include displaying (e.g., at a computing device) at least one request associated with the video survey. The operation at block 910 may be performed using the survey manager 415, peripheral device 135, sensor units 110, or apparatus 405, described with reference to FIGS. 1-6. In some examples, the operation at block 910 may be performed, additionally or alternatively, using the display component 520 as described with reference to FIG. 5.

At block 915, the method 900 may include receiving, from the customer or the potential customer, an audio response to the at least one request associated with the video survey. The operation at block 915 may be performed using the survey manager 415, peripheral device 135, sensor units 110, or apparatus 405, described with reference to FIGS. 1-6. In some examples, the operation at block 915 may be performed, additionally or alternatively, using the sensor component 505 as described with reference to FIG. 5.

At block 920, the method 900 may include analyzing the audio response (e.g., received at block 915) to determine whether the audio response is a positive response to the at least one request or a negative response to the at least one request. The operation at block 920 may be performed using the survey manager 415, peripheral device 135, sensor units 110, or apparatus 405, described with reference to FIGS. 1-6. In some examples, the operation at block 920 may be performed, additionally or alternatively, using the analysis component 510 as described with reference to FIG. 5.

At block 925, the method 900 may include concluding the video survey based on the analyzing (e.g., the analyzing of the audio response at block 920). The operation at block 925 may be performed using the survey manager 415, peripheral device 135, sensor units 110, or apparatus 405, described with reference to FIGS. 1-6. In some examples, the operation at block 925 may be performed, additionally or alternatively, using the analysis component 510 as described with reference to FIG. 5.

In some examples, examples from two or more of the methods 700, 800, and 900 may be combined and/or separated. It should be noted that the methods 700, 800, and 900 are just example implementations, and that the operations of the methods 700, 800, and 900 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some examples, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Further, while various examples have been described and/or illustrated here in the context of fully functional computing systems, one or more of these exemplary examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may permit and/or instruct a computing system to perform one or more of the exemplary examples disclosed here.

This description, for purposes of explanation, has been described with reference to specific examples. The illustrative discussions above, however, are not intended to be exhaustive or limit the present systems and methods to the precise forms discussed. Many modifications and variations are possible in view of the above teachings. The examples were chosen and described in order to explain the principles of the present systems and methods and their practical applications, to enable others skilled in the art to utilize the present systems, apparatus, and methods and various examples with various modifications as may be suited to the particular use contemplated.

What is claimed is:

1. A method for a video survey, the method being performed by a computing device comprising at least one processor, the method comprising:
   receiving a request to access the video survey for a customer;
   displaying, at the computing device, at least one question associated with the video survey;
   recording, by a camera included in the computing device, a video response to the at least one question associated with the video survey, wherein the response is received from the customer;
   determining, by a processor and based at least in part on a physical characteristic of the customer determined from the video response, whether the video response comprises a positive response or a negative response to the at least one question; and
   determining, by the processor and based at least in part on the video response comprising a positive response or a negative response to the at least one question, whether to conclude the video survey or to present, through the computing device, an additional question.

2. The method of claim 1, wherein the video response to the at least one question additionally comprises at least one of an audio response, a tactile response, or a combination thereof.

3. The method of claim 2, further comprising:
   receiving, at the camera included in the computing device, a video of the customer;
   detecting a face of the customer in a field-of-view (FOV) of the camera; and
   performing an image recognition analysis on the detected face, wherein receiving the video response to the at least one question is based at least in part on the image recognition analysis.

4. The method of claim 3, further comprising:
   identifying one or more facial features of the customer based at least in part on the image recognition analysis; and
   identifying a gesture associated with the video response to the at least one question included in the video survey, wherein the gesture is identified based at least in part on the one or more facial features.

5. The method of claim 4, further comprising:
   analyzing the gesture to determine whether the gesture is a positive gesture or a negative gesture, wherein concluding the video survey is based at least in part on the analyzing.

6. The method of claim 2, further comprising:
   receiving, from the customer, the audio response to the at least one question associated with the video survey; and
   analyzing the audio response to determine whether the audio response is a positive response to the at least one question or a negative response to the at least one question, wherein concluding the video survey is based at least in part on the analyzing.

7. The method of claim 1, wherein displaying the at least one question further comprises:
   displaying, on a first portion of a display of the computing device, a video of a representative associated with a service; and displaying, on a second portion of the display of the computing device, the at least one question and one or more instructions to respond to the at least one question.

8. The method of claim 7, wherein displaying the at least one question and the one or more instructions further comprises:
displaying a first answer to the at least one question and a second answer to the at least one question, wherein the first answer is a positive response to the at least one question and the second answer is a negative response to the at least one question.

9. The method of claim 8, further comprising:
receiving, from the customer, a tactile response to the at least one question included in the video survey; and
analyzing the tactile response to determine whether the tactile response comprises a selection of the first answer or the second answer, wherein concluding the video survey is based at least in part on the analyzing.

10. The method of claim 1, further comprising:
retrieving the video survey for the customer in response to receiving the question, wherein displaying the at least one question is based at least in part on the retrieving.

11. The method of claim 1, wherein concluding the video survey further comprises:
determining that a predetermined number of questions associated with the video survey has been displayed at the computing device; and
generating an account associated with the customer based at least in part on the determining.

12. The method of claim 1, wherein the video survey comprises at least one of a survey performed prior to a service, a survey performed after a service, or a combination thereof.

13. The method of claim 12, wherein the at least one question associated with the survey performed prior to the service comprises a question to seek consent to record the video survey, a question related to a monthly payment associated with the service, a question related to a duration of a contract associated with the service, a question related to an appearance of a personnel associated with the service, or a combination thereof.

14. The method of claim 12, wherein the at least one question associated with the survey performed after the service comprises a question to seek consent to record the video survey, a question related to receiving one or more copies of an agreement associated with a service, a question related to a behavior of a personnel associated with the service, or a combination thereof.

15. The method of claim 1, further comprising:
determining a duration of a contract associated with the customer based at least in part on concluding the video survey; and
storing the video survey for the duration of the contract associated with the customer.

16. The method of claim 1, wherein the video survey is associated with a security and automation system.

17. An apparatus for a video survey, comprising:
a processor,
memory in electronic communication with the processor; and
instructions stored in the memory and executable by the processor to cause the apparatus to:
receive a request to access the video survey for a customer;
display at least one request question associated with the video survey;
record an action of receiving a response to the at least one question associated with the video survey, wherein the response is received from the customer;
determine, by a processor and based at least in part on a physical characteristic of the customer determined from the video response, whether the video response comprises a positive response or a negative response to the at least one question; and
determine, by the processor and based at least in part on the video response comprising a positive response or a negative response to the at least one question, whether to conclude the video survey or to present, through the computing device, an additional question.

18. The apparatus of claim 17, wherein the response to the at least one question additionally comprises at least one of an audio response, a tactile response, or a combination thereof.

19. The apparatus of claim 17, wherein the video survey comprises at least one of a survey performed prior to a service, a survey performed after the service, or a combination thereof.

20. A non-transitory computer-readable medium storing code for a video survey of a security and automation system, the code comprising instructions executable by a processor to:
receive a request to access the video survey for a customer;
display at least one question associated with the video survey;
record an action of receiving a response to the at least one question associated with the video survey, wherein the response is received from the customer; and
determine, by a processor and based at least in part on a physical characteristic of the customer determined from the video response, whether the video response comprises a positive response or a negative response to the at least one question; and
determine, by the processor and based at least in part on the response to the video response comprising a positive response or a negative response to the at least one question, whether to conclude the video survey or to present, through the computing device, an additional question.

* * * * *